(12) United States Patent
Mori

(10) Patent No.: US 6,965,453 B1
(45) Date of Patent: Nov. 15, 2005

(54) IMAGE PROCESSOR FOR PRINTING

(75) Inventor: Kenji Mori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/541,902

(22) Filed: Apr. 3, 2000

(30) Foreign Application Priority Data

Apr. 1, 1999 (JP) ................................ 11-095078

(51) Int. Cl.[7] .......................... G06F 15/00; H04N 1/36; G06K 9/00
(52) U.S. Cl. ....................... 358/1.9; 358/409; 382/166
(58) Field of Search .............................. 358/1–9, 1.15, 358/410, 409, 411, 539; 382/233, 162, 166

(56) References Cited

U.S. PATENT DOCUMENTS

| | | | | |
|---|---|---|---|---|
| 4,965,771 | A | * 10/1990 | Morikawa et al. | ......... 358/1.13 |
| 5,578,824 | A | * 11/1996 | Koguchi et al. | ............ 250/318 |
| 5,726,778 | A |   3/1998 | Tanio | |
| 5,835,244 | A | * 11/1998 | Bestmann | ................... 358/523 |
| 5,838,333 | A | * 11/1998 | Matsuo | ....................... 345/604 |
| 5,978,553 | A | * 11/1999 | Ikeda | .......................... 358/1.9 |
| 5,999,710 | A | * 12/1999 | Smith et al. | ................ 358/1.15 |
| 6,002,814 | A | * 12/1999 | Chadez | ........................ 382/303 |
| 6,067,169 | A | *  5/2000 | Ohnishi | ....................... 358/1.9 |
| 6,112,010 | A | *  8/2000 | Koyama et al. | .............. 386/95 |
| 6,441,913 | B1 | *  8/2002 | Anabuki et al. | ............ 358/1.12 |
| 6,538,762 | B1 | *  3/2003 | Terashima et al. | ......... 358/1.15 |
| 6,549,666 | B1 | *  4/2003 | Schwartz | .................... 382/233 |
| 6,628,419 | B1 | *  9/2003 | So et al. | ..................... 358/1.16 |
| 6,643,399 | B1 | * 11/2003 | Fujiwara | ..................... 382/167 |
| 6,798,538 | B1 | *  9/2004 | Yamada et al. | .............. 358/1.9 |

FOREIGN PATENT DOCUMENTS

| | | | | |
|---|---|---|---|---|
| JP | 8-331401 | 12/1996 | ............ | H04N 1/60 |
| JP | 9-284579 | 10/1997 | ............ | H04N 1/60 |
| JP | 410210275 A | * 8/1998 | .......... | H04N 1/387 |
| JP | 11-10960 | 1/1999 | ............. | B41J 5/30 |

OTHER PUBLICATIONS

Japanese Patent Abstract No. JP-09277606 dated Oct. 28, 1997.

* cited by examiner

*Primary Examiner*—Madeleine Nguyen
(74) *Attorney, Agent, or Firm*—Sughrue Mion, PLLC

(57) ABSTRACT

To enable processing both the image data of RGB and the image data of CMYK and enhance printing speed, the following measures are taken. An image processor for printing according to the present invention is provided with an expander for expanding both the image data in the first color space of RGB and others and the image data in the second color space of CMYK and others and image data supply means for converting expanded image data to the image data in the second color space and supplying it to a print engine if the expanded image data is the image data in the first color space or supplying expanded image data to the print engine without converting it if the expanded image data is the image data in the second color space. If image data in the first color space is supplied from a host computer and if image data in the second color space is supplied, the image data is also once compressed and is stored in a memory, the compressed image data is expanded by the image processor for printing as it is, is converted only in the case of the image data in the first color space and is supplied to the print engine as the expanded image data in the second color space.

14 Claims, 13 Drawing Sheets

SECOND EMBODIMENT

IMAGE PROCESSOR FOR PRINTING

BACKGROUND OF THE INVENTION

1. Field of the Invention

The present invention relates to an image processor for printing used in an electronic printer provided with a print engine, particularly relates to an image processor for printing wherein compressed image data every color in predetermined color space is supplied, is expanded and is supplied to a print engine.

The present application is based on Japanese Patent Application No. Hei. 11-95078, which is incorporated herein by reference.

2. Description of the Related Art

An electronic printer such as a page printer prints image data in predetermined color space generated by a host computer and others by a print engine utilizing a laser beam and others. Such an electronic printer generates image data corresponding to plural colors in color space corresponding to the colors of toner, forms a latent image on a drum according to image data of each color in the print engine, fixes toner of the corresponding color and transfers it on printing paper. Therefore, such an electronic printer is provided with an image memory (or a band memory) for storing image data for at least one page and further, an image processor for processing image data stored in the image memory and generating image data adapted to the print engine.

Normally, as the quantity of image data stored in an image data is enormous, it is stored in the image memory as image data compressed according to a predetermined algorithm. Therefore, the image processor at least expands such compressed image data and supplies the expanded image data to the print engine.

A conventional type image processor expands compressed image data every color and supplies it to a print engine as it is. Therefore, the image processor starts the expansion of compressed image data and supplies the expanded image data to the print engine according to a horizontal synchronizing signal corresponding to the printing timing of the print engine or a video clock (or a dot clock). If compressed image data is expanded, the image data of the preceding raster is required to be referred depending upon algorithm for compression and in that case, the image processor instructs to once store the expanded image data and refers to the preceding expanded image data with the start of expansion.

As described above, the conventional type image processor is required to execute all image processing such as internal expansion processing and the reference of the preceding expanded image data for expansion depending upon the printing timing of the print engine.

An electronic printer may also receive the image data of RGB from a host computer and may also receive the image data of CMYK corresponding to toner of a print engine. An image processor in a conventional type electronic printer processes only the image data of CMYK corresponding to toner utilized in a print engine. Therefore, when the image data of RGB is supplied, it is converted to the image data of CMYK by a color conversion unit in an electronic printer and the compressed image data of CMYK for one page for example is stored in an image buffer (a band memory). When the image data of CMYK is supplied, it is compressed as it is and is stored in an image buffer. Afterward, as described above, the above image data is expanded by the image processor in accordance with the timing of the print engine and is supplied to the print engine.

However, fixed processing time is required to convert the image data of RGB for one page and in a method of once compressing the converted image data of CMYK, storing it in the image buffer and afterward expanding it every raster, a long time is required for printing. Particularly, color conversion processing is equivalent to overhead in printing processing and it takes a long time until printing is started.

SUMMARY OF THE INVENTION

The object of the present invention is to provide an image processor for printing wherein the above problems of conventional art are solved.

Further, another object of the present invention is to provide an image processor for printing wherein both the image data in first color space of RGB and others and the image data in second color space of YMCK and others can be processed.

Further, still another object of the present invention is to provide an image processor for printing wherein both image data in first color space and image data in second color space can be processed and image data in second color space can be supplied to a print engine in an electronic printer provided with the print engine that prints based upon second color space.

Further, still another object of the present invention is to provide an image processor for printing wherein both image data in first color space and image data in second color space can be processed and image data in second color space can be supplied to a print engine in an electronic printer provided with the print engine in a tandem system that prints based upon second color space.

To achieve the above, an image processor for printing according to the present invention is provided with an expander for expanding both the image data in first color space of RGB and others and the image data in second color space of CMYK and others and image data supply means for converting the expanded image data to image data in second color space and supplying it to a print engine if the expanded image data is image data in first color space and supplying the expanded image data to the print engine without converting the expanded image data if the expanded image data is image data in second color space.

According to the above invention, both in case image data in first color space is supplied from a host computer and in case image data in second color space is supplied, the image data is once compressed and is stored in a memory, the compressed image data is expanded by an image processor for printing according to the present invention as it is, the expanded image data is converted only if it is image data in first color space and is supplied to a print engine as expanded image data in second color space. Therefore, time until image data in first color space is supplied from a host computer, is expanded inside and is supplied to a print engine is reduced as image data in second color space and high speed printing is enabled.

To achieve the above object, the present invention is characterized in that an image processor for printing wherein compressed image data every color in first or second color space is supplied, is expanded and the expanded image data is supplied to a print engine for printing with toner in the second color space is provided with an expander for expanding supplied compressed image data in first or second color space, an expanded image data memory for storing image data expanded by the expander in first or second color space and image data supply means for reading the expanded image data from the expanded image memory, converting the read data to expanded image data in second color space if the read data is expanded image data in first color space and supplying expanded image data in second color space to a print engine without converting if the read data is expanded image data in second color space.

Also, to achieve the above object, the present invention is characterized in that an image processor for printing wherein compressed image data every color in first or second color space is supplied, is expanded and the expanded image data is supplied to a print engine for printing with toner in the second color space is provided with an expander for expanding supplied compressed image data in first or second color space, an expanded image data memory having capacity for storing expanded image data at least for the number of colors in first color space for storing image data expanded by the expander in first or second color space and image data supply means for reading the expanded image data from the expanded image memory, converting the read data to expanded image data in second color space if the read data is expanded image data in first color space and supplying expanded image data in second color space to a print engine without converting if the read data is expanded image data in second color space.

Also, to achieve the above object, the present invention is characterized in that an image processor for printing wherein compressed image data every color in first or second color space is supplied, is expanded and the expanded image data is supplied to a print engine for printing with toner in the second color space is provided with an expander for expanding supplied compressed image data in first or second color space, an expanded image data memory for storing image data expanded by the expander in first or second color space, plural expanding units corresponding to the number of colors at least in first color space and image data supply means for reading the expanded image data from the expanded image memory in the above plural expanding units, converting the read data to expanded image data in second color space if the read data is expanded image data in first color space and supplying expanded image data in second color space to a print engine without converting if the read data is expanded image data in second color space.

Features and advantages of the invention will be evident from the following detailed description of the preferred embodiments described in conjunction with the attached drawings.

DETAILED DESCRIPTION OF THE PREFERRED EMBODIMENTS

Figure 1:
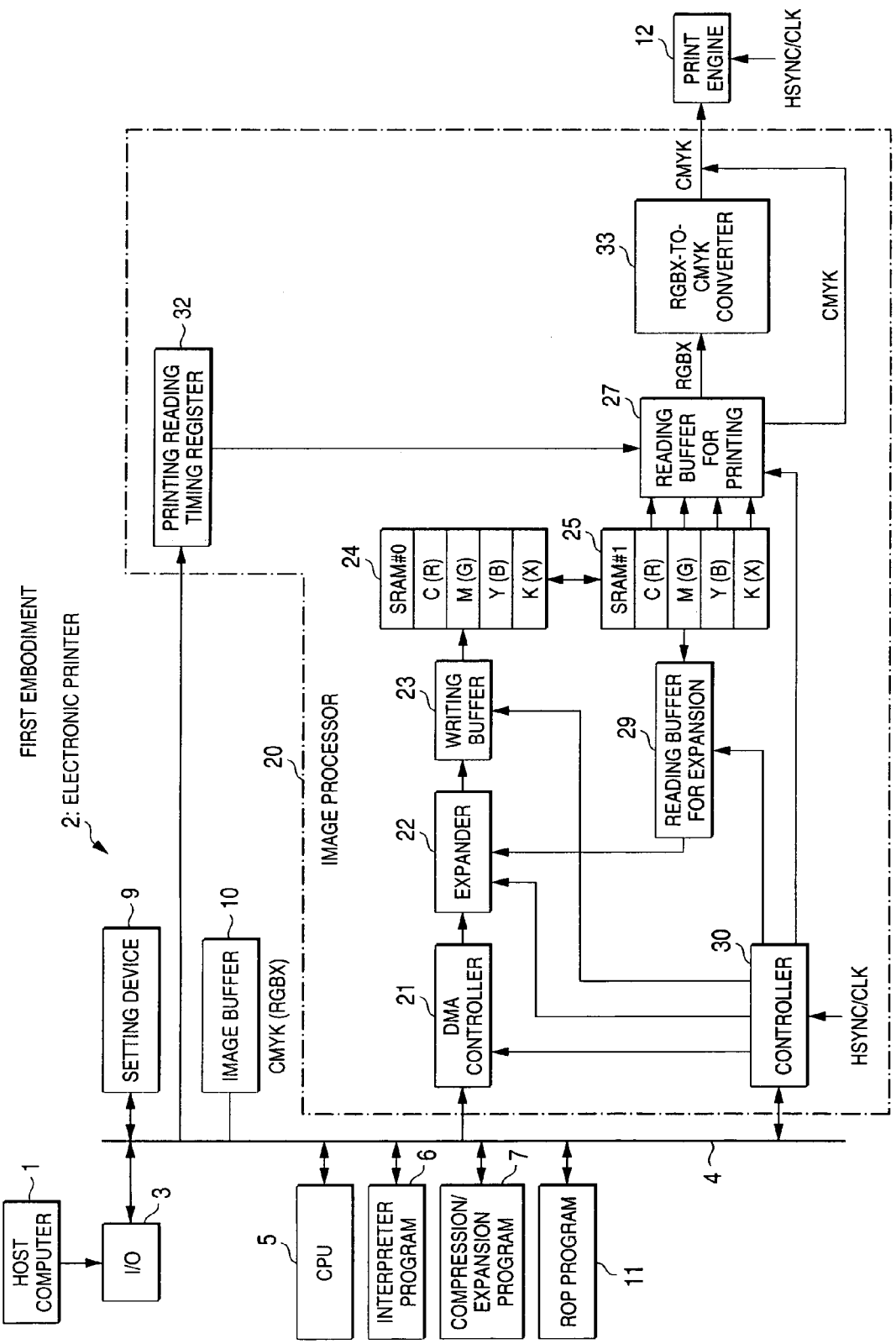
FIG. 1 shows the configuration of an electronic printer in a first embodiment.

Referring to the drawings, embodiments of the present invention will be described below. However, such embodiments do not limit the technical range of the present invention. The present invention relates to an image processor in an electronic printer, however, in the following embodiments, an example of a page printer utilizing a laser beam will be described. However, the present invention is not limited to such a page printer.

First Embodiment

FIG. 1 shows the configuration of an electronic printer in a first embodiment. An electronic printer 2 such as a page printer is connected to a host computer 1 via an input-output buffer 3. In the electronic printer 2, a controller for processing image data described in predetermined print language supplied from the host computer 1 is provided in addition to a print engine 12 for executing actual printing. The controller is equivalent to a part except the print engine 12 and the host computer 1 in FIG. 1, are provided with CPU 5, a memory 6 for storing an interpreter program for interpreting supplied image data, a memory 7 for storing a compression/expansion program, an image buffer (a band memory) 10 for storing compressed image data for one page for example, a memory 11 for storing a raster operation (ROP) program for synthesizing images such as overlapping plural images based upon the image data of RGB, a setting device 9 for setting a printing position and others and these are connected via a system bus 4. Further, the controller is provided with an image processor 20 for expanding compressed image data stored in the image buffer 10 and supplying the expanded image data adapted to the print engine.

Image data described in predetermined print language supplied from the host computer 1 is interpreted according to an interpreter program by CPU 5. CPU 5 compresses image data every raster for example according to a compression/expansion program. The compressed image data is stored in the image buffer 10 every color in color space in units of raster.

Image data normally supplied from the host computer 1 may be image data in the color space of RGB and may be image data in the color space of CMYK which are each toner of the print engine. In the print engine 12 of a page printer and others, each toner of CMYK is utilized. The electronic printer 2 in this embodiment once compresses image data in any color space, stores it in the image buffer 10 and expands it by the image processor 20. The image buffer 10 is composed of DRAM for recording compressed image data for one page for example and others. If the image data of RGB is supplied, it is converted to image data in the color space of CMYK after it is expanded in the image processor 20. The image processor 20 supplies image data of CMYK in accordance with the printing timing of the print engine 12.

The image processor 20 is an integrated circuit formed as an application specific integrated circuit (ASIC) for example, directly reads compressed image data in the image buffer 10, expands it, converts it if necessary and supplies the expanded image data to the print engine. The image processor 20 in the first embodiment is provided with a controller 30 for controlling internal timing, a direct memory access (DMA) controller 21 for directly reading compressed image data in the image buffer 10 without passing CPU 5, an expander 22 for expanding the read compressed image data, first and second expanded image memories 24 and 25 composed of a high speed memory for storing the expanded image data such as SRAM, a reading buffer for printing 27 for reading the expanded image data from the first or second expanded image memory 24 or 25 and a converter 33 for converting the image data of RGB to the image data of CMYK. Image data supply means for supplying the image data of CMYK to the print engine 12 is composed of the reading buffer for printing 27 and the converter 33 for color conversion.

Further, the image processor 20 is provided with a reading buffer for expansion 29 for reading expanded image data from the first or second expanded image memory 24 or 25 and supplying it to the expander 22 and a printing reading timing register 32 for storing the information of an image in which position in a raster is to be printed.

For example, the image data in color space of RGB is supplied from the host computer 1, is compressed by the compression program 7 and is stored in the image buffer 10 in units of color plane and in units of raster.

The DMA controller 21 continuously reads compressed image data from the image buffer (the band memory) 10 and supplies it to the expander 22. The speed of the DMA controller 21 has only to be speed enough to continue to always supply the quantity of data required by the expander 22. The expander 22 normally expands compressed image data in units of raster (a printed line) and the expanded image data in units of raster is written to either of the first or second expanded image memory 24 or 25 by a writing buffer 23. As for the speed of expansion processing by the expander 22, one dot is not necessarily required to be expanded every one dot clock (or image clock) CLK of the print engine and in one raster time, compressed image data for one raster has only to be expanded. A dot clock CLK has a cycle acquired by dividing the cycle of a horizontal synchronizing signal HSYNC which is timing for scanning in the horizontal scanning direction of a laser beam in the print engine 12 by the number of dots in one raster.

The expanded image memories 24 and 25 are a high speed random access memory composed of SRAM and others for example, respectively have capacity enough to store expanded plural (for example, four) image data for one raster, expanded image data in the memory can be read at arbitrary timing from an arbitrary address and at least two sets of first and second expanded image memories 24 and 25 are provided. These two sets of expanded image memories 24 and 25 are physically separate memories and while image data is written to either, image data can be read from the other.

The reading buffer 27 for printing and the reading buffer for expansion 29 read expanded image data in units of raster from either of the first or second expanded image memory 24 or 25 at timing independent of the timing of expansion processing by the expander 22. The reading buffer for printing 27 reads expanded image data from the expanded image memories 24 and 25 according to a dot clock (HSYNC, CLK) which is the timing of printing by the print engine 12, converts it to the format of the print engine as it is and supplies if the expanded image data is the image data of CMYK. If the expanded image data is the image data of RGB, it is converted to the image data of CMYK by the converter 33 for color conversion and is supplied to the print engine 12. Though the following is described in detail later, the reading buffer 27 for printing reads expanded image data every raster every raster timing of the print engine 12 in response to a control signal from the controller 30 and supplies it to the converter 33 and the print engine 12 or repeatedly supplies expanded image data every raster timing to the converter 33 for color conversion and the print engine 12. Also, the reading buffer for printing 27 sometimes reads expanded image data in an arbitrary position in a raster according to information set in the printing reading timing register 32 and supplies. Hereby, a print image is shifted by predetermined quantity on printing paper and can be printed.

The reading buffer for expansion 29 is utilized in case the expanding algorithm of the expander 22 requires the reference of image data in the preceding raster. The reading buffer for expansion 29 reads expanded image data in the expanded image memories 24 and 25 composed of SRAM at the timing of the memory and bus width, converts it to the format of the expander 22 and supplies it at the timing of expansion processing. If the reading buffer for expansion 29 and the reading buffer for printing 27 simultaneously read expanded image data from the same expanded image memory 24 or 25, both buffers alternately read by 8 bytes for example according to a time sharing system and convert to the data length and the timing of the respective supply destinations.

The print engine 12 drives a laser for example and prints based upon the supplied expanded image data of CMYK. Printing for one sheet every color plane is executed and when printing for all planes of CMYK is finished, a color image is formed on printing paper. Or in the case of a tandem system, the image data of CMYK is supplied in parallel and is printed.

The image processor 20 in the first embodiment is an integrated circuit formed as ASIC. The image processor 20 is provided with the expanded image memories 24 and 25 for storing image data after expansion as described above and can separately control the timing of expansion by the expander 22 and timing when the reading buffer for printing 27 supplies expanded image data to the print engine 12. Hereby, as described later, the resolution conversion processing of image data and the shift of a printed position on printing paper can be relatively easily executed.

The first embodiment can correspond to both a case that the image data of CMYK corresponding to the color of toner of the print engine 12 is supplied from the host computer 1 and a case that the image data of RGB corresponding to color defined in an application program run on the host computer is supplied as described above. Therefore, in the image buffer 10, the compressed image data of RGB may be stored and the compressed image data of CMYK may be stored.

Therefore, the image processor 20 is composed so that both the compressed image data of CMYK and the compressed image data of RGB can be processed. That is, the two sets of expanded image memories 24 and 25 provided in the image processor 20 can respectively store expanded image data for four colors. Accordingly, the writing buffer 23 can write expanded image data every color of CMYK or RGB to the expanded image memories 24 and 25. Further, the reading buffer for printing 27 can read the expanded image data of RGB from the expanded image memories 24 and 25 in parallel from an arbitrary position at arbitrary timing. The reading buffer for expansion 29 can read expanded image data every color corresponding to the processing of the expander 22 and supply it.

For example, if image data described in PostScript is supplied, the image data of CMYK already converted by an application program is supplied from the host computer 1. In that case, the electronic printer 2 compresses the supplied image data of CMYK corresponding to the color of toner as it is and instructs the image buffer (the band memory) 10 to store it. In the case of image data described in PostScript, unique color conversion processing specified by an operator is executed in the host computer 1 without depending upon color conversion processing by the electronic printer 2 and the electronic printer 2 only prints the supplied image data of CMYK as it is.

In the meantime, if the image data of RGB is supplied from the host computer 1 as image data generated by a normal application program and others, the image data of RGB is also compressed as it is and is stored in the image buffer (the band memory) 10. The image data is expanded every raster by the image processor 20, is converted to the image data of CMYK by the converter 33 for color conversion and is supplied to the print engine 12.

In this embodiment, attribute data X for specifying conversion processing such as specifying a conversion table utilized for color conversion processing is attached to the image data of RGB. Therefore, in this embodiment, the image data in the color space of RGB is the image data including attribute data of RGBX.

If the image data of RGB generated by a normal application program and others is supplied from the host computer 1, the RGB image data is stored in the image buffer 10 and for example, synthesis processing such as overlapping RGB image data on plural pages can be executed in the electronic printer. Such an image synthesis function may be called raster operation (ROP).

As described above, when the image processor 20 is composed so that it can process only the image data of CMYK in case the compressed image data of RGBX is stored in the image buffer 10, the image data of RGBX for one page is required to be converted to the image data of CMYK by a color conversion unit before the above image data is expanded in the image processor 20. When expansion processing is executed by one raster in the image processing 20 after the above color conversion processing, it takes a relatively long time to execute color conversion processing before expansion processing and the overhead of time required for printing is extended.

Then, in the first embodiment, the two sets of expanded image memories 24 and 25 provided in the image processor 20 can respectively store the image data of four colors. That is, the four compressed image data of RGBX stored in the image buffer 10 are continuously read in one raster cycle by the DMA controller 21, are expanded by the expander 22 and the expanded image data of four colors is written to either in a written state of the expanded image memory 24 or 25. In the next raster cycle, the written expanded image data of RGBX is read from the memories 24 and 25 in a read state in parallel by the reading buffer for printing 27, is converted from the image data of RGBX to any image data of CMYK by the converter 33 for color conversion and is supplied to the print engine 12. The converter 33 sets a color conversion table not shown according to attribute data X and converts to any image data of CMYK by one dot utilizing the color conversion table.

According to the above image processor 20, the expansion processing and the color conversion processing of the image data of RGBX can be executed in units of raster according to pipelining, overhead can be reduced, compared with a case that color conversion processing for one page is first executed and printing speed can be enhanced.

If the image data of CMYK is stored in the image buffer 10, it is expanded by the expander 22, is stored in the expanded image memories 24 and 25, the reading buffer for printing 27 reads it and the read data is directly supplied to the print engine 12 without passing the converter 33.

A case that the image processing 20 shown in FIG. 1 in the first embodiment applies image processing such as expansion to the image data of CMYK and supplies the image data to a single print engine, a case that image processing including expansion and color conversion is applied to the image data of RGBX and the image data is supplied to a single print engine and a case that image processing is applied to the image data of CMYK and the image data is supplied to a print engine in a tandem system will be sequentially described below.

Figure 2:
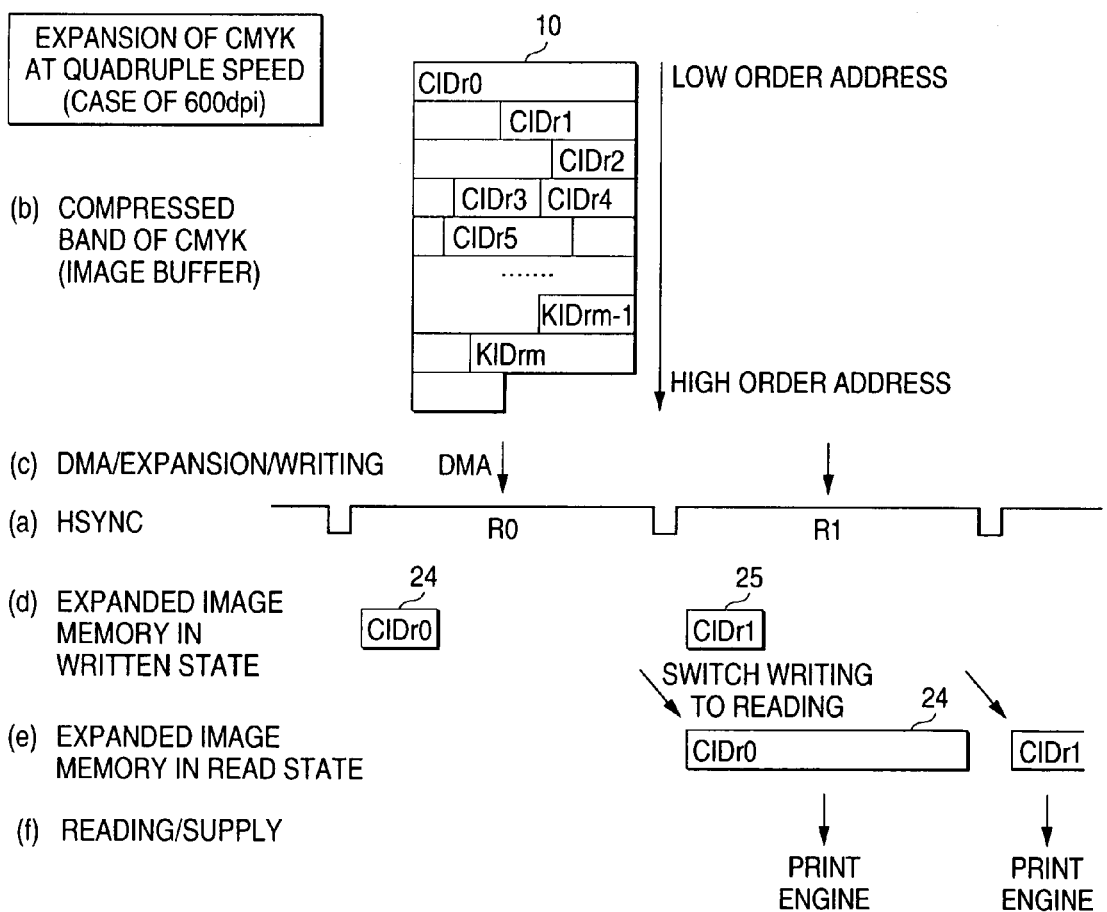
FIG. 2 is a timing chart in case image processing is applied to the compressed image data of CMYK.

FIG. 2 is a timing chart in case image processing is applied to the compressed image data of CMYK stored in the image buffer (the band memory) 10. FIG. 2(*a*) shows a horizontal synchronizing signal HSYNC showing the timing of printing by the print engine 12 such as raster cycles R0 and R1. FIG. 2(*b*) shows image memories for CMYK in the image buffer 10 and in this example, in the image buffer 10, the compressed image data of CMYK is stored in units of raster. That is, the image data CIDr0, CIDr1, - - - of a C plane are stored from an area having a low order address and in an area having a high order address, the image data KIDrm-1 and KIDrm of a K plane are stored. FIG. 2(*c*) shows reading by the DMA controller 21, expansion processing by the expander 22 and writing processing to the image memories 24 and 25 by the writing buffer 23. FIGS. 2(*d*) and 2(*e*) respectively show image data in the expanded image memory in a written state and in the expanded image memory in a read state. FIG. 2(*f*) shows the reading of expanded image data by the reading buffer for printing 27 and supply processing to the print engine 12.

In the example shown in FIG. 2, the resolution of image data shall be unchanged. Every raster cycle R0 or R1, the DMA controller 21 reads compressed image data in the image buffer 10 in units of raster and supplies it to the expander 22 (processing (c)). In the example shown in FIG. 2, the image processing of the C plane is shown and first, the compressed image data CIDr0 of cyan is read. The compressed image data CIDr0 is expanded by the expander 22 according to expansion 10 algorithm and is written to the expanded image memory 24 in a written state by the writing buffer 23 (processing (c)).

In the next raster cycle R1, the compressed image data CIDr1 of the next raster is read by the DMA controller 21, is supplied to the expander 22 and is written to the expanded image memory 25 in a written state by the writing buffer 23. In parallel, the reading buffer for printing 27 reads the stored expanded image data CIDr0 for one raster from the expanded image memory 24 in a read state and directly supplies it to the print engine 12. Reading timing at this time is controlled by a control signal from the controller 30 and the area of expanded image data to be read in a raster is set in the printing reading timing register 32. The frequency of reading, the frequency of repetition and others are controlled by a control signal from the controller 30 and the above change of resolution is enabled. Also, the shift of a printed image on printing paper is enabled by setting a read area based upon a set value in the printing reading timing register 32 and controlling reading timing. In any case, the reading timing and the supply timing of the reading buffer for printing 27 are controlled at timing independent of expansion processing.

In the raster cycle R1, if the expander 22 requires the reference of the image data of the preceding raster, expanded image data CIDr0 in the expanded image memory 24 in a read state is read in accordance with the timing of expansion processing by the reading buffer 29 for expansion and is supplied to the expander 22. The reading timing of the reading buffer for expansion 29 is independent of that of the reading buffer for printing 27. However, if both buffers 27 and 29 are required to simultaneously read the same expanded image data CIDr0, it is read according to a time sharing system in units of predetermined data (for example, in units of 8 bytes).

In the next raster, the similar image processing is also executed by the image processor 20. When the image processing for one page of the C plane is finished, the image processing for one page of the next M plane is executed and further, the image processing for one page of a Y plane and a K plane is executed. As a result, in the print engine 12, the respective toner of CMYK is overlapped according to the respective latent images on printing paper and a color image is generated.

Figure 3:
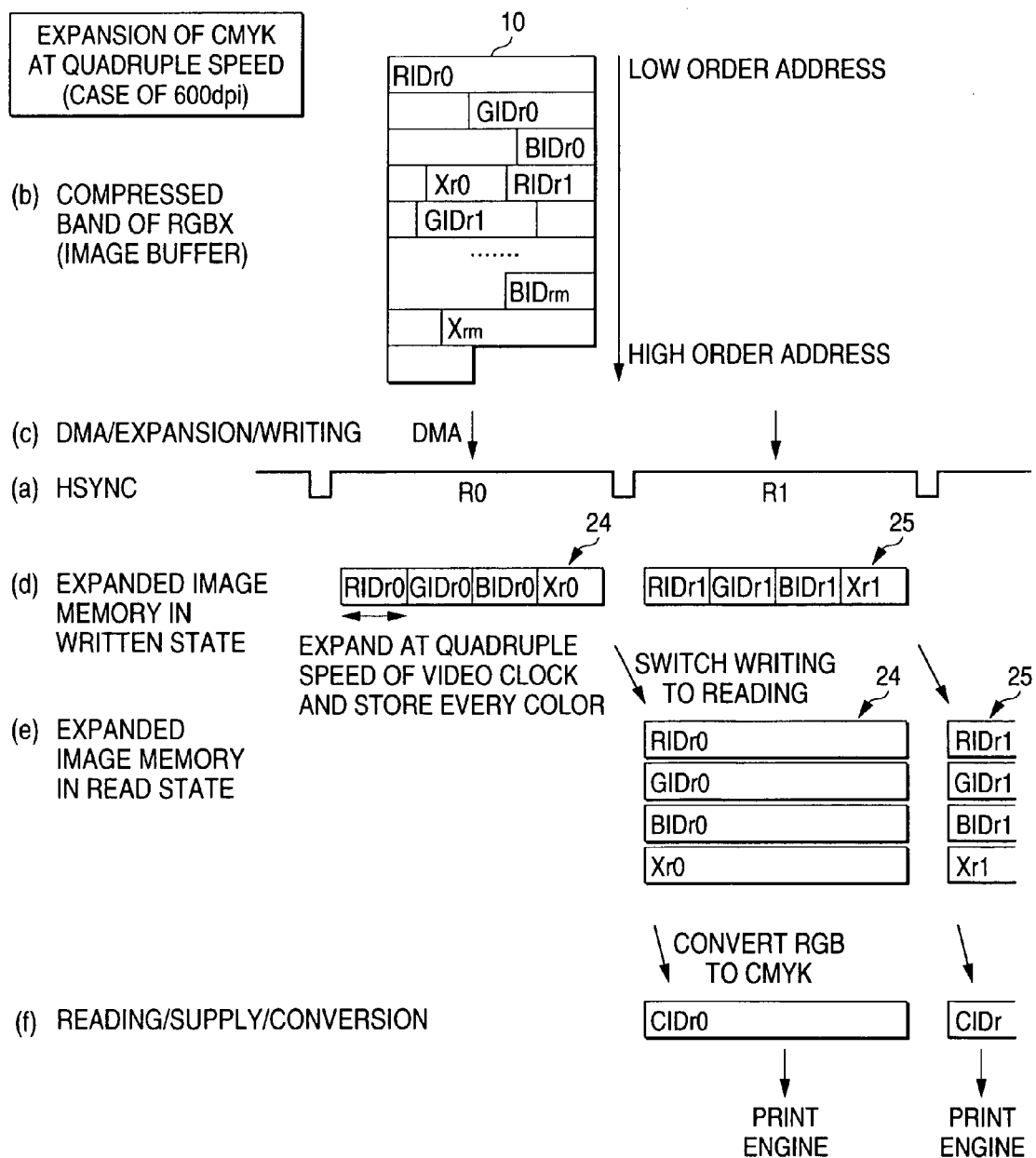
FIG. 3 is a timing chart for explaining a case that image processing including expansion and color conversion is applied to the image data of RGBX and the image data is supplied to a single print engine.

FIG. 3 is a timing chart for explaining a case that image processing including expansion and color conversion is applied to the image data of RGBX and the image data is supplied to a single print engine. (a) to (f) in FIG. 3 are the same as those in FIG. 2. In a case shown in FIG. 3, in the image buffer 10, the image data of RGBX (however, X is attribute data) is sequentially stored in units of raster from an area having a low order address to an area having a high order address. That is, for a raster r0, the image data RIDr0 of R, the image data GIDr0 of G, the image data BIDr0 of B and the attribute data Xr0 of X are stored. The data length of these is respectively different. For the next raster r1, the respective data of RGBX is also similarly stored for one raster and the respective data of RGBX for the last raster rm is stored in a final area.

In the case shown in FIG. 3, the image data CID for one raster of the C plane for example is supplied to the print engine 12 by expanding all the image data of RGBX and supplying it to the converter 27 for color conversion in one raster cycle. Therefore, the DMA controller 21, the expander 22, the writing buffer 23 and the reading buffer for expansion 29 have quadruple high speed throughput, compared with the case of CMYK shown in FIG. 2 and in one raster cycle, four types of image data are processed.

In the raster cycle R0, the DMA controller 21 reads the image data (however, including attribute data X) of RGBX in the first raster r0 from the image buffer 10 and supplies it to the expander 22 (processing (c)). The expander 22 expands each image data RIDr0, GIDr0, BIDr0 and Xr0 at the quadruple speed of a video clock CLK determined based upon a horizontal synchronizing signal HSYNC. The writing buffer 23 writes the expanded image data RIDr0, GIDr0, BIDr0 and Xr0 to the respective corresponding areas in the expanded image memory 24 in a written state (processing (c)).

In the next raster cycle R1, the DMA controller 21 similarly reads the image data of RGBX in the next raster r1 from the image buffer 10, supplies it to the expander 22 and the expander 22 expands each image data RIDr1, GIDr1, BIDr1 and Xr1 at the quadruple speed of a video clock CLK. At this time, if the expander 22 requires the reference of the image data of the preceding raster by one, each image data RIDr0, GIDr0, BIDr0 and Xr0 are sequentially read from the expanded image memory 24 in a read state corresponding to the timing of expansion processing by the expander 22 by the reading buffer or expansion 29 and are supplied to the expander 22.

Expanded image data RIDr0, GIDr0, BIDr0 and Xr0 in the expanded image memory 24 in a read state are read in parallel by the reading buffer for printing 27 and are supplied to the converter 33 for color conversion. In the converter 33 for color conversion, the image data of RGB is converted to the image data CIDr0 of the C plane utilizing the corresponding color conversion table referring to attribute data X. The above color conversion processing is executed in synchronization with an image clock CLK of the print engine in units of dot. The image data CIDr0 to which color conversion is applied is supplied to the print engine 12 and is printed. At this time, the delay of the processing of the converter 33 for color conversion occurs in the image data CIDr0 supplied to the print engine 12, however, if the delay is compared with time required for color conversion processing for one page before expansion processing, the delay time is shorter.

In the above example, as the image data of four colors can be simultaneously stored in the expanded image memories 24 and 25, the reading buffer for printing 27 can read the data of RGBX in parallel and can supply it to the converter 33 for color conversion. In the converter 33 for color conversion, the image data of RGB is converted to any image data of CMYK in units of dot corresponding to the printing speed of the print engine 12. Therefore, printing speed can be enhanced more than that in case color conversion processing to CMYK is applied to the image data for one page of RGBX before the image processor 20.

Figure 4:
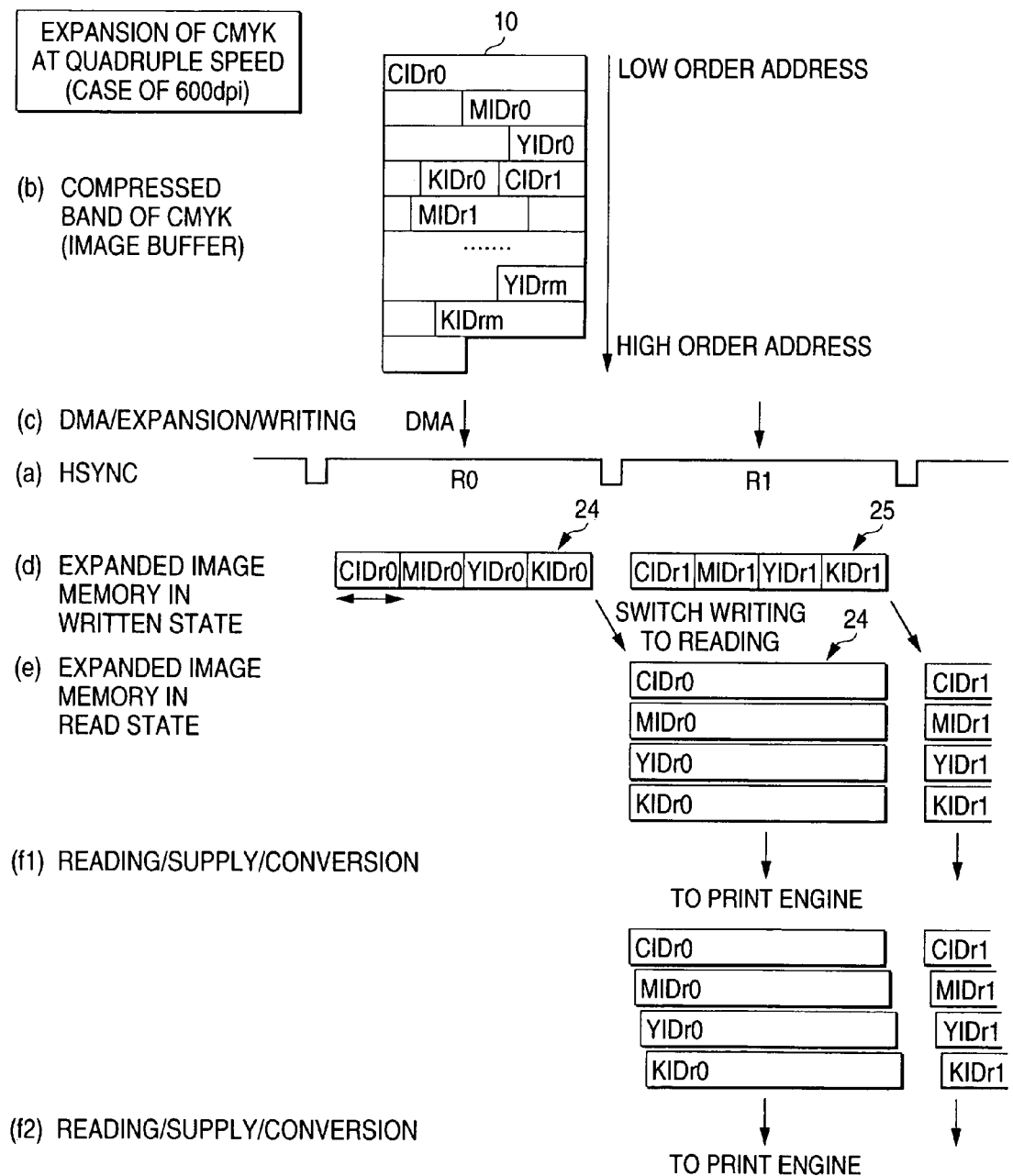
FIG. 4 is a timing chart in case image processing is applied to the image data of CMYK and the image data is supplied to a print engine in a tandem system.

FIG. 4 is a timing chart in case image processing is applied to the image data of CMYK and the image data is supplied to a print engine in a tandem system. In the first embodiment shown in FIG. 1, the DMA controller 21, the expander 22 and others have ability to process four image data in one raster cycle. However, if the image data of CMYK is stored in the image buffer 10 as shown in FIG. 2, the expansion of image data and supply to the print engine are executed every plane of each color. Therefore, in the case of the image data of CMYK, the ability of expander 22 and others is not utilized fully.

In FIG. 4, an example of a tandem type that the print engine 12 can print the image data of four colors in parallel is shown, the image data of CMYK is expanded in each raster cycle, is written to the expanded image memories 24 and 25, is read in parallel and is supplied to the print engine 12.

In the image buffer 10, the compressed image data of CMYK to which color conversion processing is applied is continuously stored every raster. That is, for the raster r0, the image data CIDr0, MIDr0, YIDr0 and KIDr0 of CMYK are stored in the order and for the next raster r1, the image data of CMYK is respectively similarly stored.

In the raster cycle R0, the DMA controller 21 reads the compressed image data CIDr0, MIDr0, YIDr0 and KIDr0 of CMYK from the image buffer 10 according to time series and supplies them to the expander 22 (processing (c)). Therefore, the expander 22 expands four compressed image data in one raster cycle. The writing buffer 23 writes their expanded image data to one expanded image memory 24 in a written state (processing (c)).

In the next raster cycle R1, the DMA controller 21 also similarly reads the compressed image data CIDr1, MIDr1, YIDr1 and KIDr1 of CMYK in the next raster from the image buffer 10 according to time series and the expander 22 expands their four compressed image data. The writing buffer 23 writes their expanded image data to the expanded image memory 25 converted to a written state (processing (c)). At this time, if the expander 22 requires the reference of the image data of the preceding raster by one, the reading buffer for expansion 29 reads the expanded image data CIDr0, MIDr0, YIDr0 and KIDr0 from the expanded image memory 24 in a read state according to the timing of expansion processing and supplies it.

As the expanded image data CIDr0, MIDr0, YIDr0 and KIDr0 of four CMYK are stored in the image memory 24 in the raster cycle R0 in a state that they are accessible in parallel, the reading buffer for printing 27 can read the image data of four colors from the respective arbitrary areas at arbitrary timing and can supply them to the print engine 12 in the raster cycle R1. If the print engine 12 is a tandem engine wherein the image data of four colors can be printed in parallel, the reading buffer for printing 27 simultaneously supplies four image data CIDr0, MIDr0, YIDr0 and KIDr0 for example in parallel as shown in FIG. 4 (f1) and high speed printing is enabled.

If the supply of the four image data CIDr0, MIDr0, YIDr0 and KIDr0 is required to be delayed by a little depending upon the operational timing of four engines in the print engine 12, the reading buffer for printing 27 reads the respective image data from the image memory 24 in a read state respectively at different time as shown in FIG. 4 (f2) and supplies it to print engine 12.

Reading timing for supplying image data to the print engine 12 can be arbitrarily set independent of expansion processing by providing two sets of expanded image memories for storing expanded image data and image data can be supplied corresponding to various print engines 12.

In the first embodiment, the image data of RGBX can be processed and the image data of CMYK can be also supplied to the tandem engine in parallel. In that case, the converter 33 for color conversion is required to have configuration for converting to the image data of four colors. For example, the image data of RGBX can be converted to the image data of four CMYK in parallel by providing the converter 33 for color conversion fourfold. In that case, processing in the image processor 20 is the same as that in the example shown in FIG. 3, only final color conversion processing is executed in parallel for four colors and the image data of CMYK is simultaneously supplied to the print engine.

In the first embodiment, reading timing, a read area, a read frequency and others by the reading buffer for printing 27 can be controlled independent of expansion processing by using either of the two sets of expanded image memories 24 and 25 for a writing memory after expansion and using the other for a reading memory for printing. Therefore, as in a second embodiment described later, printing at different resolution is also enabled. Further, a printed image can be also suitably shifted on printing paper and printed by suitably controlling reading timing and a read area by the reading buffer for printing 27.

Figure 5:
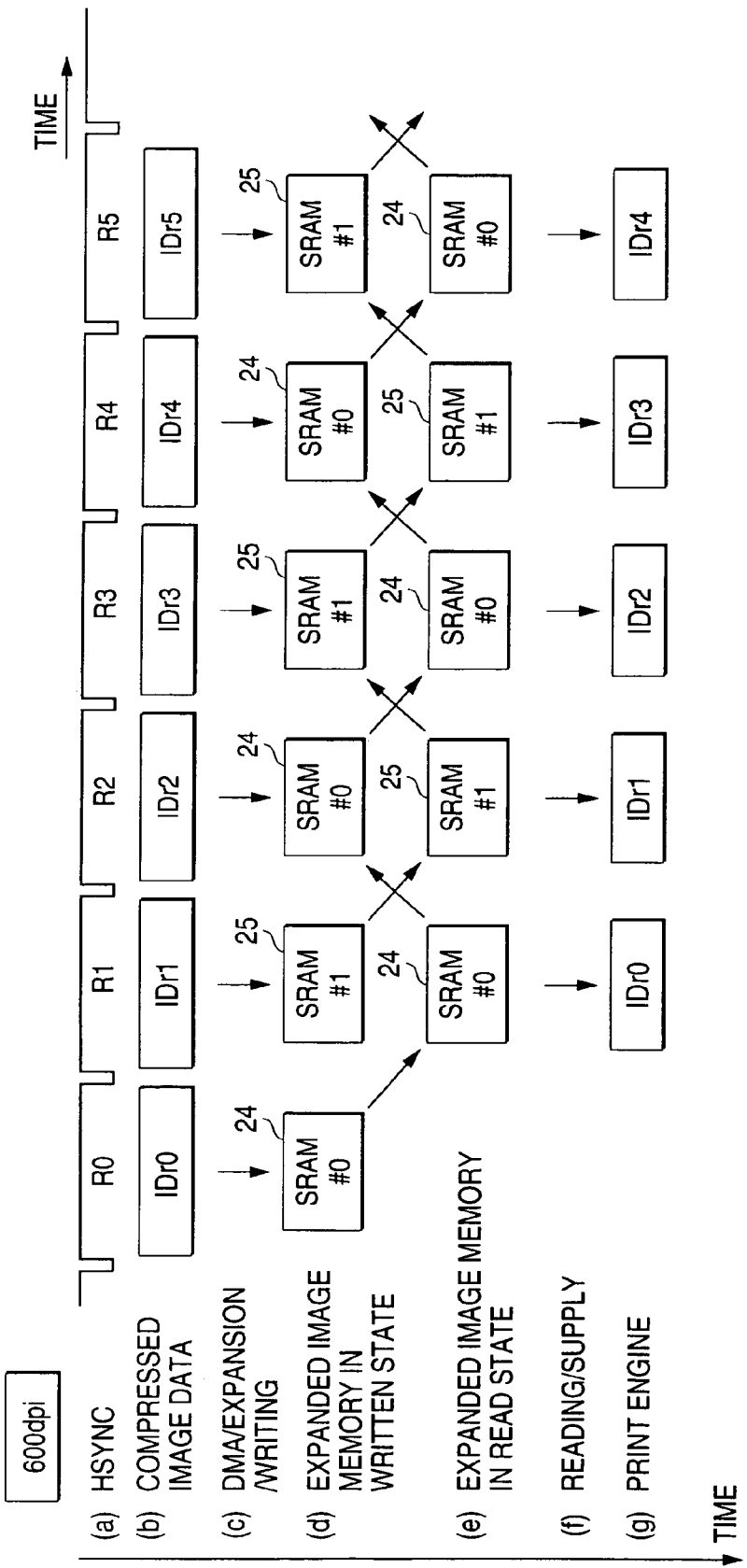
FIG. 5 shows the processing of an image processor in case resolution is unchanged.

FIG. 5 shows the processing of the image processor in case resolution is unchanged. In this example, the image processor 20 processes compressed image data corresponding to the resolution of 600 dpi, generates image data corresponding to 600 dpi which is the resolution of the print engine 12 and supplies it to the print engine 12. FIGS. 5(a) to (f) correspond to (a) to (f) in FIGS. 2, 3 and 4. FIG. 5(g) shows image data printed by the print engine 12.

Compressed image data IDr0 to IDr5 in units of raster stored in the image buffer (the band memory) 10 are read at timing every raster by the DMA controller 21, are supplied to the expander 22 and are respectively expanded (processing (c)). The writing buffer 23 alternately writes the expanded image data to the expanded image memories 24 and 25 (Processing (c)). The expanded image memory 24 is shown as SRAM#0 and the expanded image memory 25 is shown as SRAM#1. Next, in the next raster cycle, the written state and the read state of the expanded image memories 24 and 25 are switched and expanded image data is alternately read from the expanded image memories 24 and 25 by the reading buffer for printing 27 (processing (f)). The reading buffer for printing 27 supplies read expanded image data to the print engine 12 in synchronization with the timing HSYNC of printing by the print engine or a dot clock CLK (processing (f)). If expanding algorithm in which the expander 22 requires the reference of the image data of the preceding raster is used, expanded image data is read from the expanded image memories 24 and 25 in a read state by the reading buffer for expansion 29 according to a time sharing system together with the reading buffer for printing 27.

As shown in FIG. 5, while image data is written to either of the expanded image memory 24 or 25, image data is read from the other of the expanded image memories 24 and 25. The frequency of both processing is equal.

Figure 6:
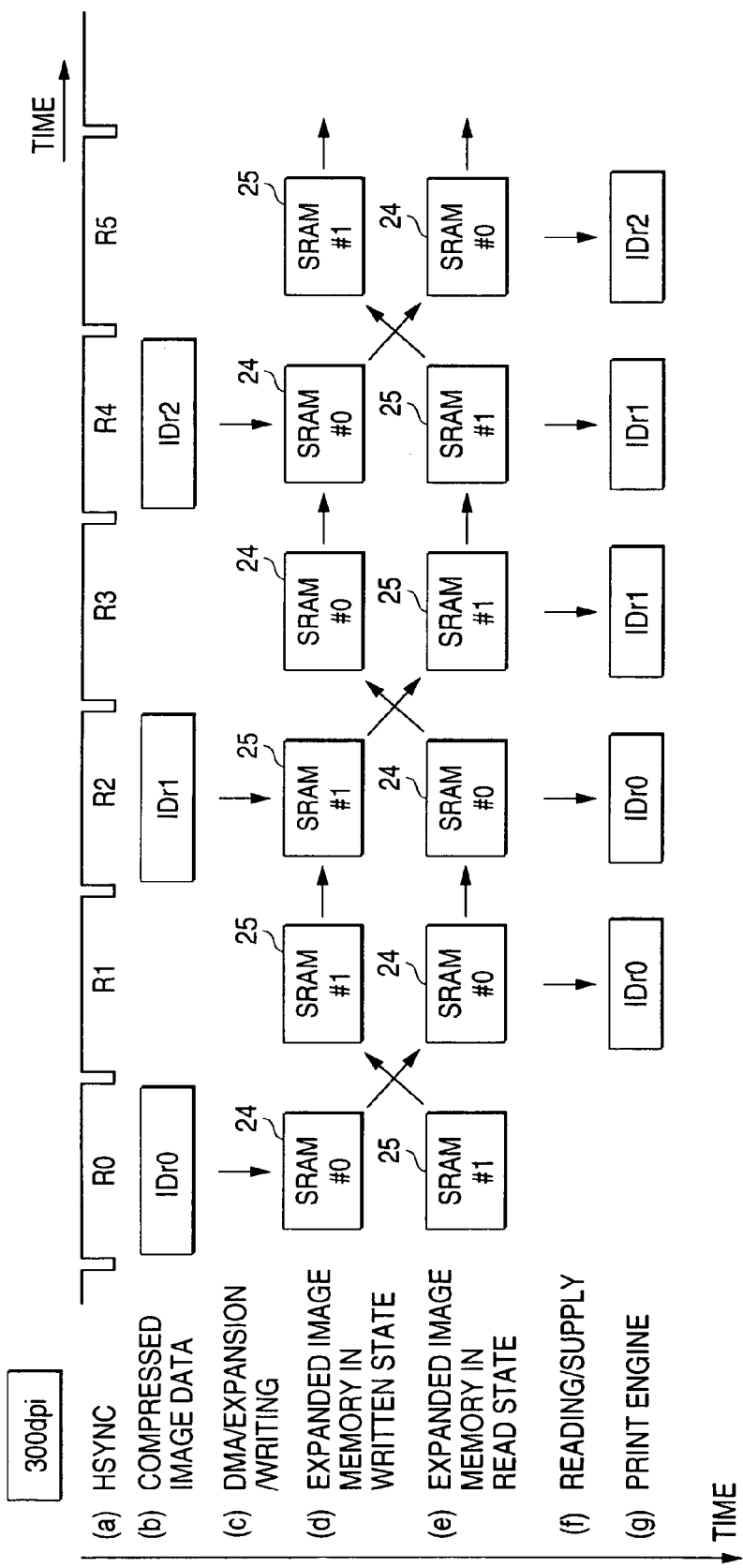
FIG. 6 shows the processing of the image processor in case resolution is converted to high resolution.

FIG. 6 shows the processing of the image processor in case resolution is converted to higher resolution. In this example, the image processor 20 processes compressed image data corresponding to the resolution of 300 dpi, generates image data corresponding to 600 dpi which is the resolution of the print engine 12 and supplies it to the print engine 12.

To print with the print engine having the resolution of 600 dpi, image data IDr0 to IDr5 corresponding to the resolution of 300 dpi are read from the image buffer 10 every other raster, are expanded and are written to the expanded image memories 24 and 25 in a written state. In the meantime, expanded image data is read every raster cycle from the expanded image, memories 24 and 25 in a read state by the reading buffer for printing 27 and is supplied to the print engine 12. The reading buffer for expansion 29 reads expanded image data in the expanded image memories 24 and 25 in a read state only when the expander 22 executes expansion processing and supplies it to the expander 22. The reading buffer for printing 27 is not required to read expanded image data by twice if the buffer has a memory provided with capacity enough to store image data for one raster inside.

The reading buffer for printing 27 and the reading buffer for expansion 29 may simultaneously read from the expanded image memory 24 (SRAM#0) according to a time sharing system depending upon expanding algorithm while image data IDr1 is expanded.

If image data supplied from the host computer 1 has higher resolution, the frequency of reading from the expanded image memories 24 and 25 in a read state and the frequency of the supply of image data to the print engine 12 become lower, compared with the frequency of expansion by the expander 22 reversely to the above case. As a result, the image data of dots thinned down at predetermined ratio from image data having high resolution is supplied to the print engine 12 and the printing of an image the resolution of which is low is enabled.

The control by the change of resolution of the DMA controller 21 and the reading buffer for printing 27 is suitably executed by the controller 30.

As shown in FIG. 6, the image processor 20 in the first embodiment is provided with at least two sets of expanded image memories 24 and 25 for temporarily storing expanded image data and while image data is written to one memory, reading from the other memory is executed independent of the above writing Owing to such configuration, the frequency of reading from the expanded image memory in a read state and the frequency of writing from the expander 22 to the expanded image memory in a written state can be separately controlled and the resolution of image data can be changed freely.

Figure 7:
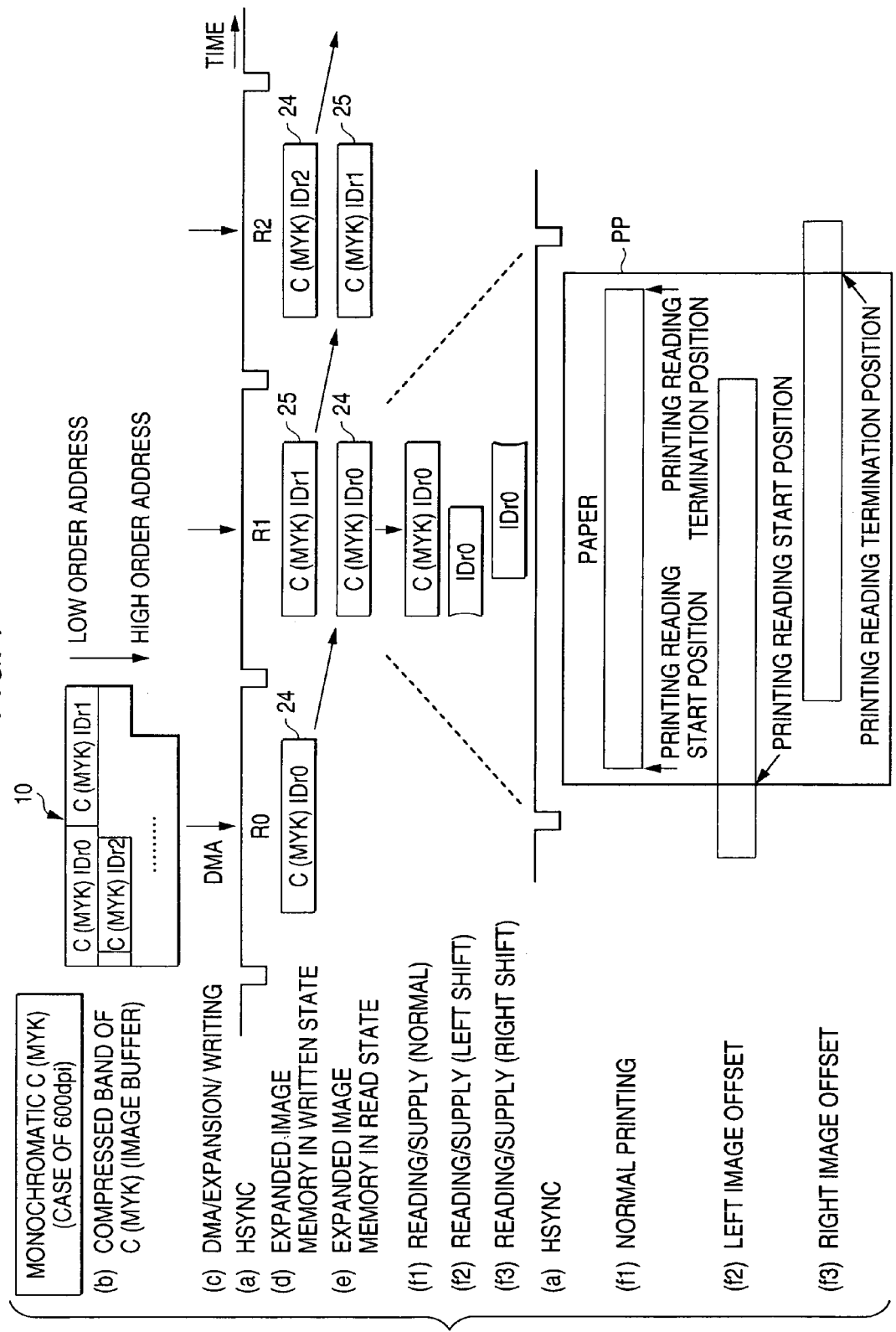
FIG. 7 is an explanatory drawing for explaining processing for shifting a printed image on printing paper.

FIG. 7 is an explanatory drawing for explaining processing for shifting a printed image on printing paper. FIGS. 7(a) to 7(f) correspond to (a) to (f) in FIGS. 2 to 6. In the image buffer (the band memory) 10, image data IDr0, IDr1 and IDr2 compressed in units of raster are stored every color of CMYK. As the image data in units of raster is compressed image data, the data length is variable.

Compressed image data in the image buffer 10 is read in order from a low order address to a high order address in units of raster by the DMA controller 21 and is supplied to the expander 22. The expander 22 expands compressed image data for one raster in the raster cycle R0 synchronized with a horizontal synchronizing signal HSYNC and the writing buffer 23 writes expanded image data to the expanded image memory 24 in a written state (processing (c)). During expansion processing by the expander 22, if necessary, the expanded image data of the preceding raster by one is read from the other memory 25 in a read state by the reading buffer for expansion 29 and is supplied to the expander 22 according to the timing of expansion processing in the format of expansion processing. In the expander 22, referring to the image data of the preceding raster, compressed image data is expanded according to predetermined expanding algorithm.

In the next raster cycle R1, the written state and the read state of the expanded image memories 24 and 25 are switched, while the expanded image data IDr1 of the next raster is written to the expanded image memory 25 in a written state, the expanded image data IDr0 of the preceding raster is read from the expanded image memory 24 in a read state by the reading buffer for printing 27 and is supplied to the print engine 12 corresponding to the printing timing of the print engine 12 in a data format adapted to the print engine 12. The above processing is executed in synchronization with the timing of a dot clock CLK of the print engine 12. Simultaneously, if required for expansion processing, image data IDr0 is read from the expanded image memory 24 by the reading buffer for expansion 29.

The reading buffer for printing 27 refers to the printing reading timing register 32 that stores a printing started position supplied by a print position setting device 9 and termination information, reads expanded image data in the expanded image memory 24 in a read state from an arbitrary address to an arbitrary address and supplies it in accordance with the printing timing of the print engine 12. An area in which such image data in a raster is read and the timing of the supply of the image data to the print engine 12 are controlled based upon information set in the register 32 independent of image data to be expanded by the expander 22 and expanding timing.

Therefore, in the case of normal printing (f1), in a raster cycle determined according to a horizontal synchronizing signal HSYNC, image data IDr0 for one raster is all read from the memory 24 in a read state and is supplied to the print engine 12 at normal timing.

If a printed image is to be shifted on the left side of printing paper PP (f2), the reading buffer for printing 27 starts to read image data on the back side in a raster in the expanded image memory 24 in a read state from a halfway area in the raster according to a set value in the register 32 in synchronization with the first timing of the raster cycle R1. As a result, on printing paper PP, as shown in FIG. 7, an image on the right side in the raster is printed and the image is shifted left on the printing paper PP. However, in the raster cycle R1, the image data IDr1 of the next raster is all expanded in the raster cycle R1. The above timing of expansion processing is independent of the reading timing of the reading buffer for printing 27 and others. If the reference of the image data of the preceding raster is required in expansion processing, the reading buffer for expansion 29 reads image data for one raster from the memory 24 in a read state and supplies it to the expander 22. That is, in the raster cycle R1, the expander 22 expands image data IDr1 for the next one raster, the reading buffer for expansion 29 reads the image data IDr0 for the preceding one raster and supplies it to the expander, the reading buffer for printing 27 reads the image data IDr0 for the second half of one raster and supplies it to the print engine 12 in synchronization with a dot clock CLK.

Further, if a printed image is to be shifted on the right side of printing paper PP (f3), the reading buffer for printing 27 starts to read image data IDr0 in the expanded image memory 24 in a read state from the leading area in a raster according to a set value in the register 32 in synchronization with the first timing of the raster cycle R1 and reads the image data to the middle of the raster. The image data IDr0 of a part is supplied to the print engine 12. As a result, on the printing paper PP, as shown in FIG. 7, an image on the left side of the raster is printed and is shifted right on the printing paper PP. The operation of the reading buffer for expansion 29 in this case is the same as that in the above case (f2).

As described above, as two sets of expanded image memories 24 and 25 that store expanded image data are provided and are controlled so that they are alternately in a written state and in a read state, the reading buffer for printing 27 can read image data in an area in an independent raster from the memories 24 and 25 in a read state at timing independent of expansion processing and can supply it to the print engine 12. Therefore, as shown in FIG. 7, image data in an arbitrary area in a raster can be supplied to the print engine 12 at arbitrary timing and can be printed. That is, a printed image in an arbitrary area is shifted in an arbitrary position on printing paper without having a bad effect upon expansion processing and can be printed.

If the image data of RGBX is stored in the image buffer 10, it is converted to any image data of CMYK by the converter 33 for color conversion between the reading buffer for printing 27 and the print engine 12. Therefore, the reading timing of the reading buffer for printing 27 is controlled counting time required for the above color conversion.

Second Embodiment

Figure 8:
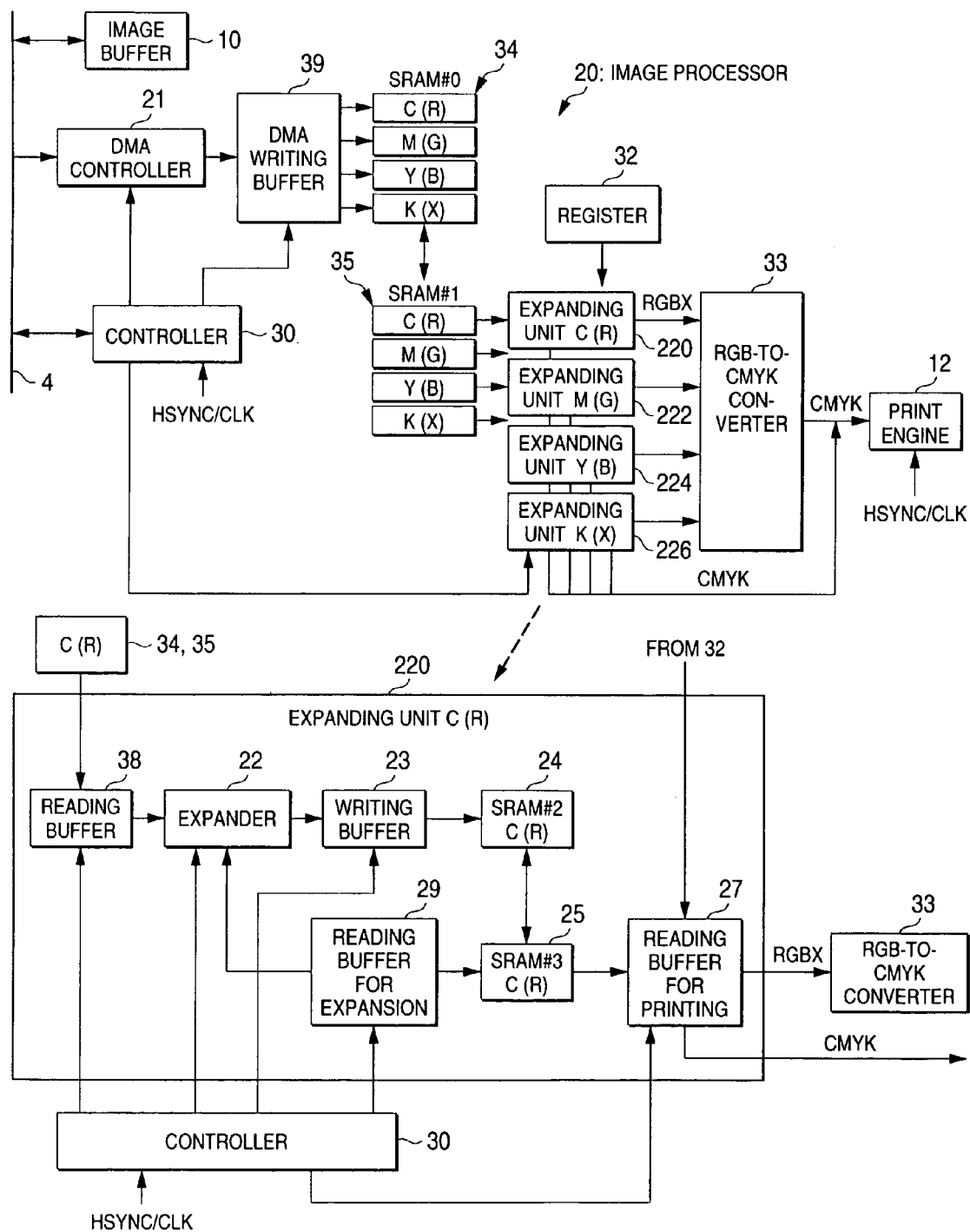
FIG. 8 shows the configuration of an electronic printer in a second embodiment.

FIG. 8 shows a part of an electrophotographic printer in a second embodiment. In the first embodiment, the expander 22 requires ability to expand four types of compressed image data in one raster cycle. If attribute data X is not attached, the expander 22 is also required to expand the compressed image data of three colors of RGB. Then, in the second embodiment, two sets of expanded image memories 24 and 25 are provided and simultaneously, two sets of compressed image memories 34 and 35 for temporarily storing compressed image data and four expanding units 220 to 226 are provided. The two sets of compressed image memories 34 and 35 are controlled as the expanded image memories 24 and 25 so that they are alternately in a written state and in a read state.

As shown in FIG. 8, the expanding unit 220 is provided with an expander 22 for the image data of one color and expanded image memories 24 and 25 differently from those in the first embodiment. As the compressed image memories 34 and 35 are respectively composed of SRAM#0 and SRAM#1, the expanded image memories 24 and 25 are shown as SRAM#2 and SRAM#3. The other expanding units 222, 224 and 226 also have the similar configuration to the expanding unit 220 shown in a lower half of FIG. 8. The expanding unit is provided with a reading buffer 38 to read compressed image data from the compressed image memories 34 and 35 and supply it to the expander 22.

As four expanding units are provided, the compressed image memories 34 and 35 one of which is in a written state and the other of which is in read state and a writing buffer 39 are provided between a DMA controller 21 and the expanding units. These compressed image memories 34 and 35 respectively at least have capacity enough to store four sets of compressed image data for one raster. The compressed image memories 34 and 35 are also controlled so that they are alternately in a written state and in a read state as the expanded image memories 24 and 25.

In the case of FIG. 8, a controller 30 is also provided in an image processor 20 and controls the DMA controller 21, the DMA writing buffer 39 and timing in the expanding unit. A horizontal synchronizing signal HSYNC or a dot clock CLK corresponding to the timing of a print engine is supplied to the controller 30.

If the image data of RGBX is stored in an image buffer 10, it is expanded by four expanding units 220 to 226, is supplied to a converter 33 for color conversion and the image data of CMYK converted according to attribute data X is supplied to the print engine 12. In this embodiment, image data supply means for supplying the image data of CMYK to the print engine 12 is also composed of the reading buffer for printing 27 and the converter 33.

Figure 9:
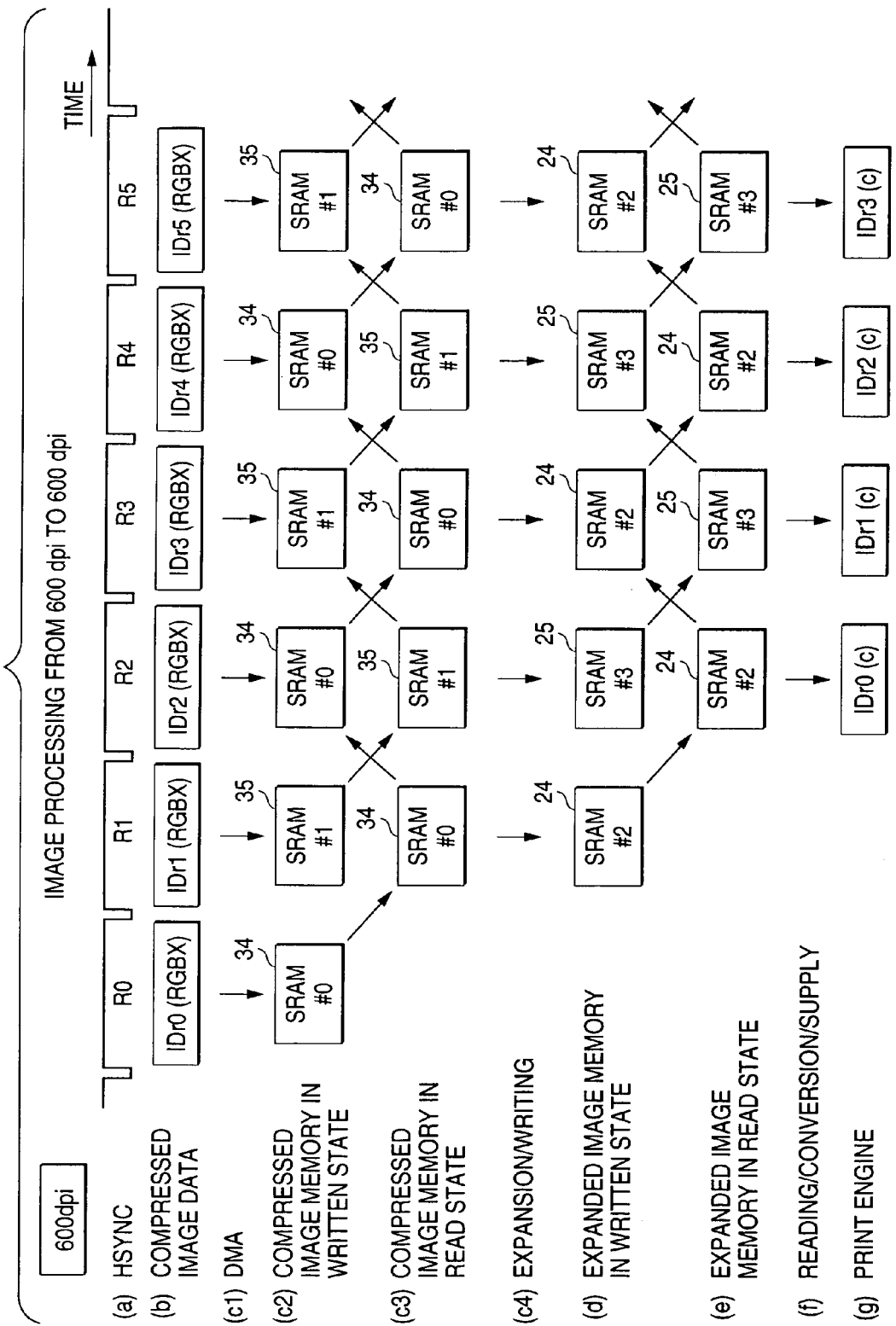
FIG. 9 shows the processing of an image processor in case resolution is unchanged in the second embodiment.

FIG. 9 shows the processing of the image processor in the second embodiment if resolution is unchanged. This case is a case that the image data of RGBX (or attribute data) is stored in the image buffer 10 and is a case that the image data of a C plane is supplied to the print engine 12.

In a raster cycle R0, the compressed image data IDr0 of RGBX for one raster stored in the image buffer 10 is read by the DMA controller 21 and is stored in the compressed image memory 34 in a written state by the DMA writing buffer 39 (processing (c1)). The compressed image memories 34 and 35 can respectively store four types of data at least for one raster.

Next, in a raster cycle R1, similarly, the compressed image data IDr1 of RGBX for one raster stored in the image buffer 10 is read by the DMA controller 21 and is stored in the compressed image memory 35 in a written state by the DMA writing buffer 39 (processing (c1)). Simultaneously, the reading buffer 38 in the expanding units 220 to 226 reads compressed image data corresponding to respective RGBX from the compressed image memory 34 in a read state and supplies it to the expander 22 in the respective expanding units. Therefore, the respective compressed image data IDr0(RGBX) are expanded in parallel by the expander 22 in the four expanding units and are written to the expanded image memory 24 in a written state by the writing buffer 23 in the respective units (processing (c4)).

In the next raster cycle R2, the next compressed image data IDr2 is read by the DMA controller 21 and is written to the compressed image memory 34 in a written state by the DMA writing buffer 39 (processing (c1)). In parallel with it, the compressed image data IDr1 of RGBX is read from the compressed image memory 35 in a read state by the reading buffer 38, is expanded by the respective expanders 22 and is written to the expanded image memory 25 in a written state (processing (c4)). The expanded data IDr0 of RGBX stored in the expanded image memory 24 in a read state is read by the reading buffer for printing 27 and is supplied to the converter 33 for color conversion in parallel (processing (f)). The above each timing of reading and supply is controlled independent of the timing of expansion as in the first embodiment so that it is arbitrary timing, an arbitrary area is read and is supplied. The converter 33 for color conversion applies color conversion processing according to the attribute data X to the expanded data of RGBX, generates the image data IDr0(C) of cyan (C) and supplies it to the print engine 12.

In the raster cycle R2, the expander 22 expands the compressed image data IDr1 of RGBX, however, if the reference of the preceding image data by one is required, the reading buffer for expansion 29 in the expanding unit reads the expanded image data IDr0 from the expanded image memory 24 (SRAM#2) in a read state in parallel according to the timing of expansion processing and supplies it to the respective corresponding expanders 22.

As shown in FIG. 9, the expansion of compressed image data and writing to the expanded image memories 24 and 25, and reading from the expanded image memories 24 and 25 and supply to the print engine after color conversion are performed every raster cycle. Therefore, the image data of 600 dpi based upon the image data of RGBX having the resolution of 600 dpi is supplied to the print engine 12 and is printed.

Figure 10:
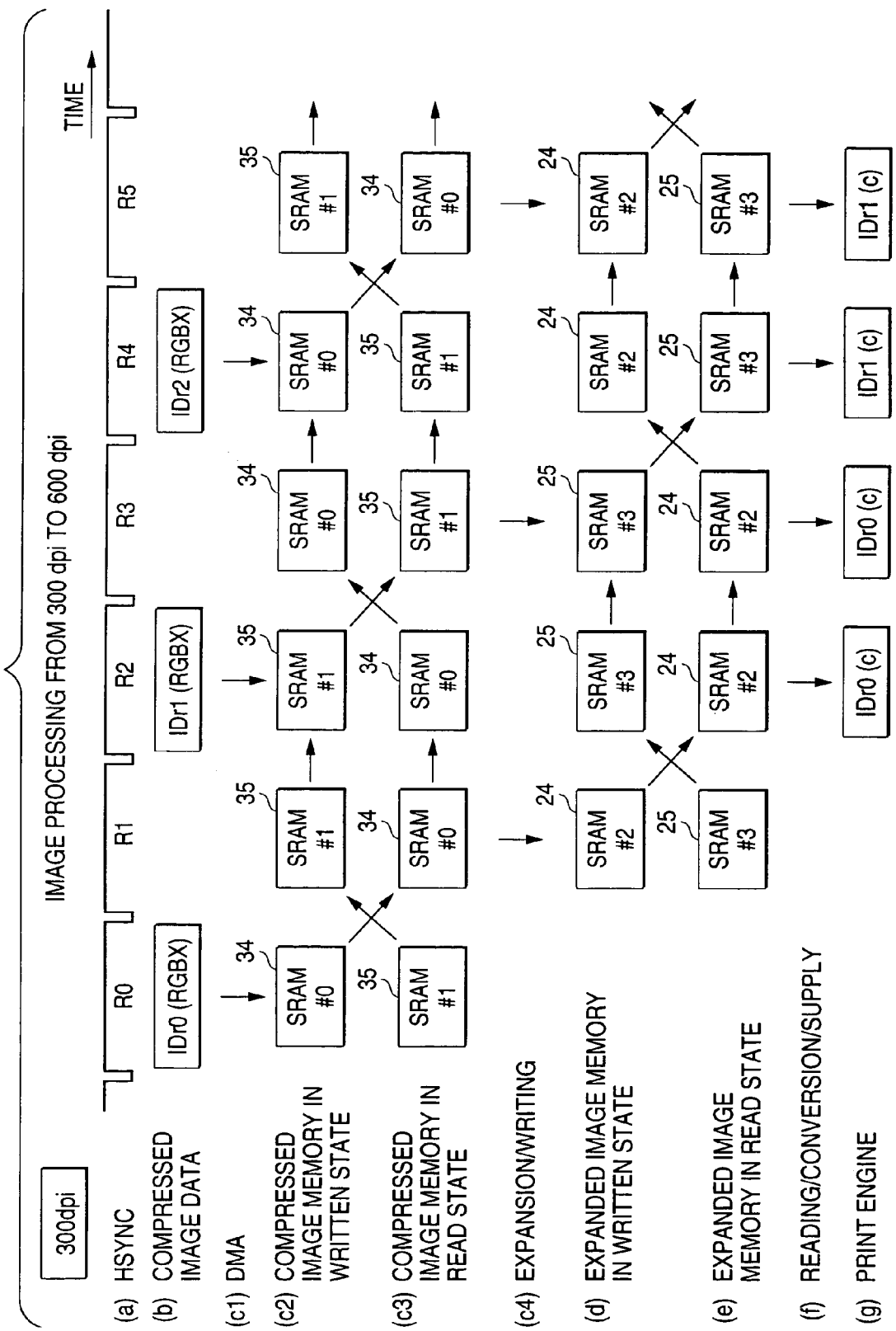
FIG. 10 shows the processing of the image processor in case resolution is changed to high resolution in the second embodiment.

FIG. 10 shows the processing of the image processor in the second embodiment if resolution is changed to high resolution. In this example, the expanded image data IDr0 (C) of the C plane of 600 dpi is generated based upon the compressed image data IDr0(RGBX) of RGBX of 300 dpi. Therefore, reading processing by the DMA controller 21 and expansion processing by the expander 22 in each expanding unit are executed once in two raster cycles and reading processing by the reading buffer for printing 27 in the expanding unit is executed every raster cycle. Therefore, the reading buffer for printing 27 has twice as many processing frequencies as those of the expander. If resolution is lowered, each frequency of the above processing is reverse. The above frequency can be easily changed by providing two sets of expanded image memories 24 and 25 one of which is in a written state and the other of which is in a read state.

First, in the raster cycle R0, the compressed data IDr0 (RGBX) of RGBX is read by the DMA controller 21 and is written to one compressed image memory 34 (processing (c1)). In the next raster cycle R1, compressed data IDr0 is respectively supplied from the respective corresponding compressed image memories 34 to the expander 22 by the reading buffer 38 in the expanding unit, is expanded and is written to the expanded image memory 24 (processing (c4)).

In the next raster cycle R2, respective expanded image data (or the attribute data X) are read from the expanded image memory 24 (SRAM#2) in a read state by the reading buffer for printing 27 and are supplied to the converter 33 for color conversion (processing (f)). The image data IDr0(C) to which color conversion processing is applied is supplied to the print engine 12. Also, in parallel, the compressed image data IDr1(RGBX) of the next raster is read by the DMA controller 21 and is written to the compressed image memory 35 in a written state.

In the next raster cycle R3, the corresponding data IDr1 (RGBX) is read from the compressed image memory 35 (SRAM#1) in a read state by the reading buffer 38, is supplied to the respective expanders 22 and is expanded. At this time, if necessary, the preceding expanded image data IDr0(RGBX) by one is read from the expanded image memory 24 in a read state by the reading buffer for expansion 29 and is supplied to the expander 22 in synchronization with expansion processing. Also, in the raster cycle R3, the reading buffer for printing 27 again reads already expanded image data IDr0(RGBX) of RGBX from the expanded image memory 24 in a read state, the converter 33 for color conversion converts it to the image data of the C plane and supplies it to the print engine 12. Hereby, the image data the resolution of which is 600 dpi equivalent to double is supplied to the print engine 12.

The compressed image data IDr2 (RGBX) of the next raster is also similarly read, is expanded, afterward, is converted at a double frequency and is supplied to the print engine.

Though not shown, in the second embodiment, a printed image can be also shifted to an arbitrary position on printing paper and can be printed by controlling a read area and reading timing by the reading buffer for printing 27 as shown in FIG. 7 in relation to the first embodiment.

Next, a case that image processing including expansion is applied to the image data of CMYK and the image data is supplied to a single print engine, a case that image processing including expansion and color conversion is applied to the image data of RGBX and the image data is supplied to a single print engine and a case that image processing is applied to the image data of CMYK and the image data is supplied to a print engine in a tandem system in the second embodiment will be sequentially described, compared with those cases in the first embodiment.

Figure 11:
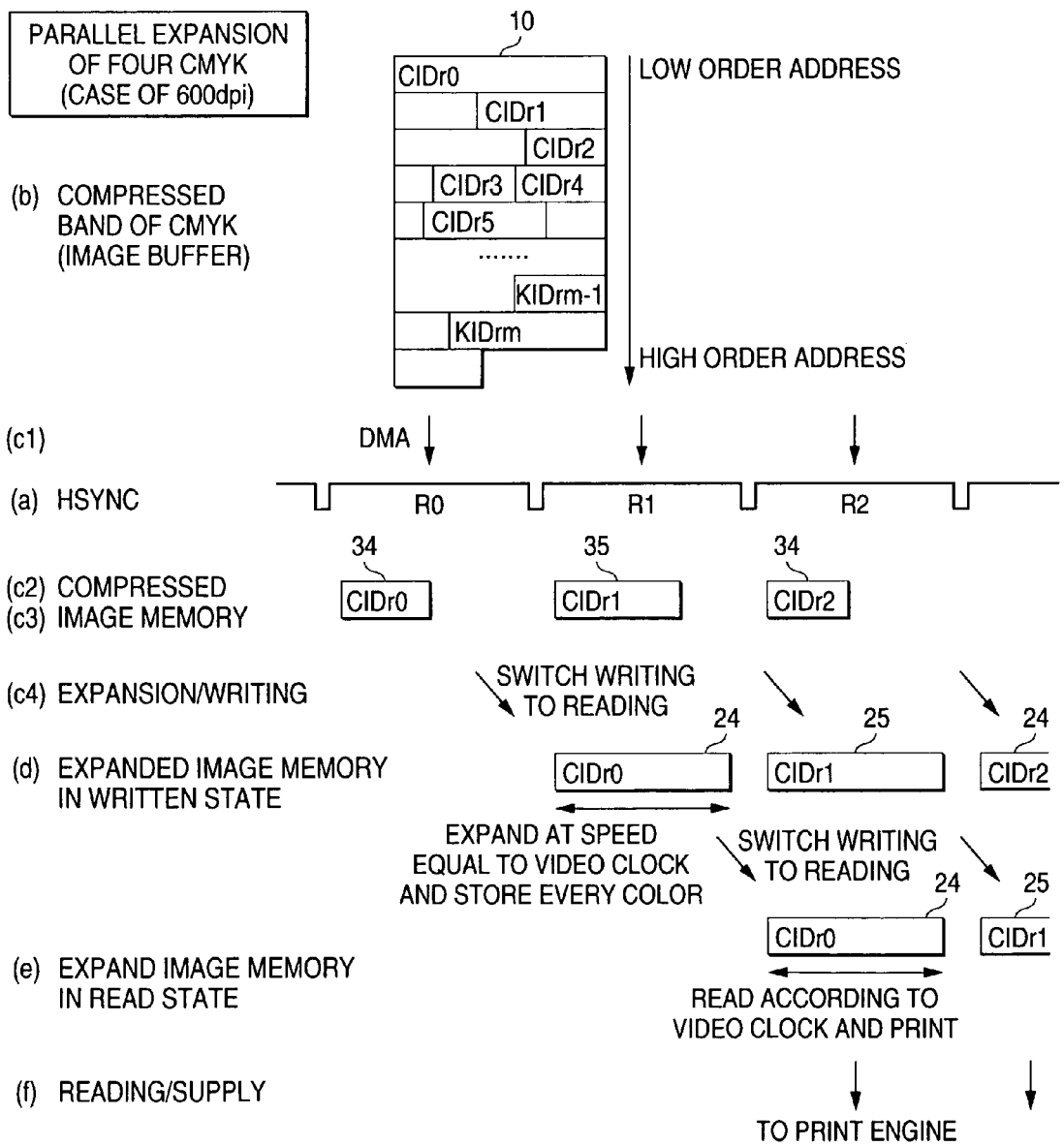
FIG. 11 is a timing chart in case image processing including expansion is applied to the image data of CMYK and the image data is supplied to a single print engine.

FIG. 11 is a timing chart in case image processing including expansion is applied to the image data of CMYK and the image data is supplied to a single print engine. In this case, only the expanding units corresponding to CMYK of four expanding units 220 to 226 execute expansion processing. In this case, compressed image data in the image buffer 10 is the same as that in FIG. 2.

In the raster cycle R0, the DMA controller 21 reads the compressed image data CIDr0 for one raster of the C plane from the image buffer 10 and writes it to the compressed image memory 34 (c1). Next, in the raster cycle R1, while the DMA controller 21 reads the next compressed image data CIDr1 and writes it to the compressed image memory 35 (c1), the reading buffer 38 reads the image data CIDr0 from the compressed image memory 34 in a read state and supplies it to the expander 22. The expander 22 expands the compressed image data CIDr0, referring to the preceding image data by one if necessary and writes it to the expanded image memory 24 in a written state. The above expansion processing is executed at speed equal to a video clock (or a dot clock) CLK synchronized with a horizontal synchronizing signal HSYNC.

In the raster cycle R2, the reading buffer for printing 27 reads expanded image data CIDr0 from the expanded image memory 24 in a read state and supplies it to the print engine 12. The above reading and supply are also executed at speed equal to a video clock (or a dot clock).

Figure 12:
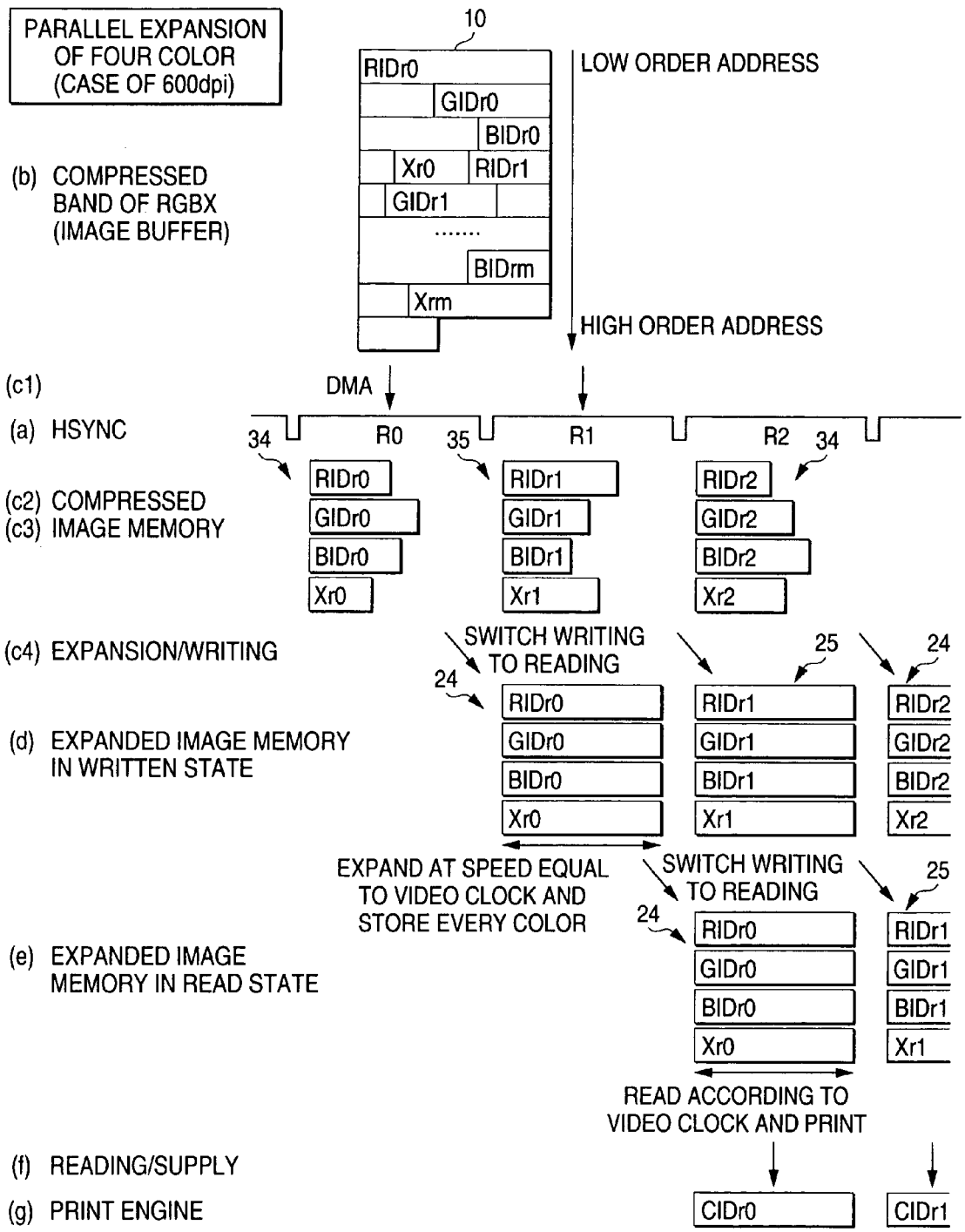
FIG. 12 is a timing chart in case image processing including expansion and color conversion is applied to the image data of RGBX and the image data is supplied to the single print engine.

FIG. 12 is a timing chart in case image processing including expansion and color conversion is applied to the image data of RGBX and the image data is supplied to a single print engine. The compressed image data of RGBX in the image buffer 10 is the same as that in the case of FIG. 3.

In the raster cycle R0, the DMA controller 21 reads the compressed image data RIDr0, GIDr0, BIDr0 and Xr0 of RGBX for a raster r0 from the image buffer and the DMA writing buffer 39 writes the compressed image data to the respective areas of the compressed image memory 34 in a written state (c1).

In the next raster cycle R1, four expanding units read the corresponding compressed image data from the compressed image memory 34 in a read state, executes expansion processing and write it to the expanded image memory 24 (c4). As in a second embodiment, four expanding units are provided in parallel differently from the first embodiment, an expander 22 in each expanding unit can execute expansion processing at speed equal to a video clock (a dot clock) CLK. At this time, if necessary, a reading buffer for expansion 29 reads image data from an expanded image memory 25 and supplies it to the respective expanders.

In the next raster cycle R2, the expanded data of RGBX is read from an expanded image memory 24 in the four expanding units and is supplied to a converter 33 for color conversion (f). The above expanded data is converted to the image data CIDr0 of a C plane according to attribute data X and is supplied to a print engine 12. The supply to the print engine is also performed at speed equal to a video clock (a dot clock).

Figure 13:
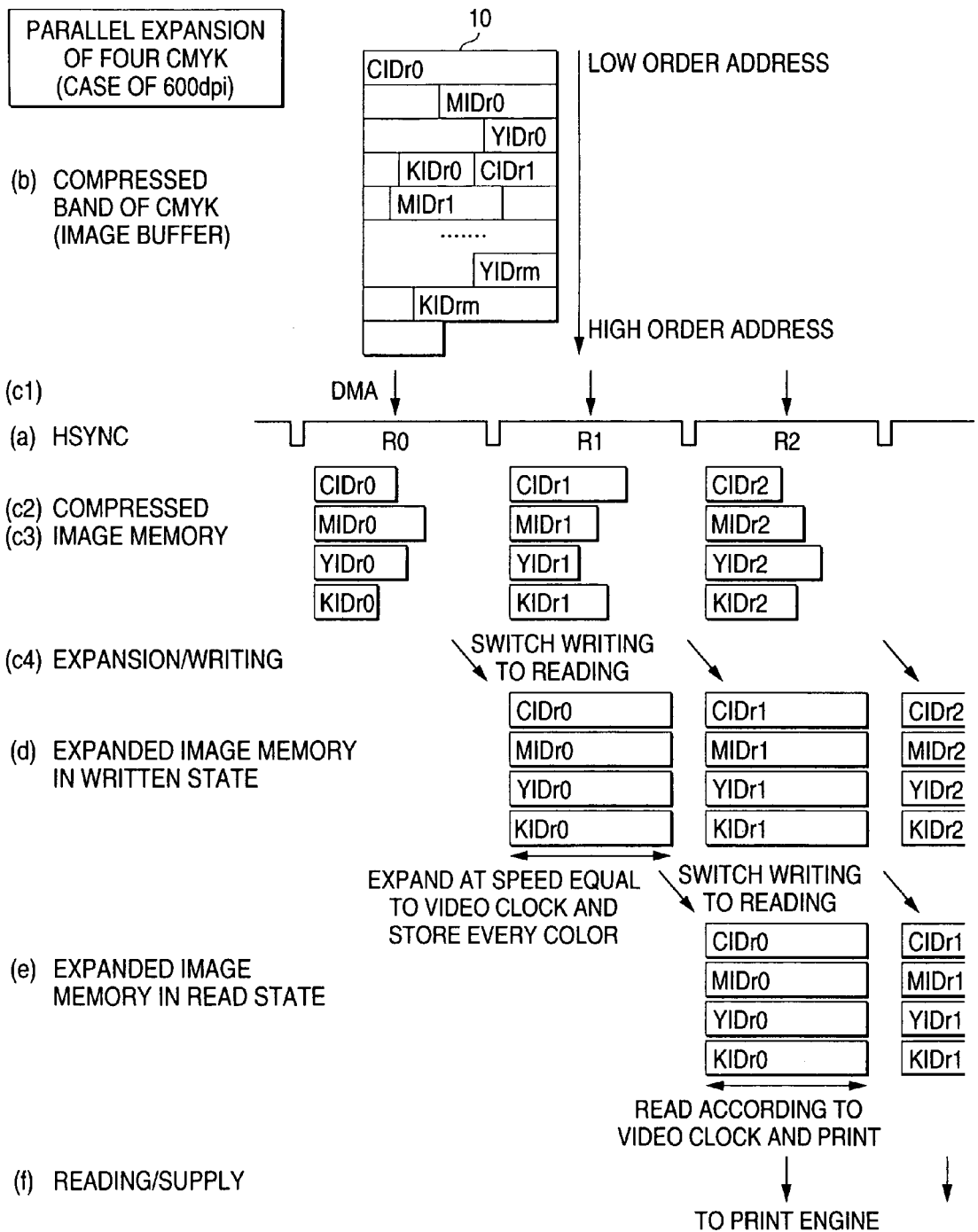
FIG. 13 is a timing chart in case image processing is applied to the image data of CMYK and the image data is supplied to a print engine in a tandem system.

FIG. 13 is a timing chart in case image processing is applied to the image data of CMYK and the image data is supplied to a print engine in a tandem system. Compressed image data in an image buffer 10 in this case is the same as that in the case of FIG. 4.

In a raster cycle R0, a DMA controller 21 reads the compressed image data CIDr0, MIDr0, YIDr0 and KIDr0 respectively for one raster of CMYK from the image buffer 10 and a DMA writing buffer 39 writes the image data to the respective corresponding area of a compressed image memory 34 (c1).

In the next raster cycle R1, a reading buffer 38 in each expanding unit reads the corresponding image data and the expander 22 executes expansion processing. A writing buffer 23 writes expanded image data to the expanded image memory 24 in a written state. The above expansion processing is executed at speed equal to an image clock (or a dot clock) CLK in parallel by the four expanding units.

In the next raster cycle R2, a reading buffer for printing 27 in each expanding unit reads the respective already expanded image data of CMYK from the expanded image memory 24 and supplies it to the print engine 12 at predetermined timing (f). Each timing of the reading and the supply by the reading buffer 27 for printing 27 is suitably controlled according to the operation of the print engine in a tandem system. Timing is controlled by a controller 30 as in the second embodiment.

Though not shown, the compressed image data of RGBX is expanded and the image data of CMYK can be also supplied to the print engine in a tandem system. In that case, as shown in FIG. 12, the data of RGBX is read from the image buffer 10, is expanded in parallel by each expanding unit, is converted to the image data of CMYK by the converter 33 for color conversion and is supplied to the print engine 12 in a tandem system at predetermined timing.

According to the image processor according to the present invention, compression processing is applied to both the compressed image data in the first color space of RGB and others and the compressed image data in the second color space of CMYK and others and after expansion processing is applied to the image data in the first color space, the expanded image data in the first color space is converted to the image data in the second color space. Therefore, even if image data in the first or second color space is supplied from the host computer, expansion processing is similarly executed, the image data can be supplied to the print engine and printing speed can be enhanced.

According to the image processor according to the present invention, the image data in the first color space of RGB and others can be read in parallel and can be converted to the image data in the second color space of CMYK and others by providing the image memories having capacity enough to store expanded image data at least for the number of colors in the first color space. Therefore, time required for color conversion is equal to speed synchronized with a dot clock and the delay of printing by color conversion is small.

What is claimed is:

1. An image processor for printing, comprising:
    an expander for expanding supplied compressed image data every color in a first or second color space;
    an expanded image memory for storing expanded image data in said first or second color space expanded by said expander;
    image data supply means for reading said expanded image data from said expanded image memory, thereby (i) converting said read data to expanded image data in second color space if said read data is expanded image data in said first color space and (ii) not converting said read data if said read data is expanded image data in said second color space; and
    a print engine for receiving said expanded image data in said second color space from said image data supply means to thereby print with toner in said second color space,
    wherein said image data supply means is controlled so as to be synchronized with the print engine.

2. An image processor for printing according to claim 1, wherein said expanded image memory has capacity enough to store expanded image data of at least four number of colors in said first color space, and
    said image data supply means reads expanded image data in said first color space from said expanded image memory in parallel and converts the read image data to expanded image data in said second color space.

3. An image processor for printing according to claim 1, further comprising a reading buffer for expansion for reading said expanded image data from said expanded image memory and supplying it to said expander.

4. An image processor for printing according to claim 3, wherein said expanded image memory has capacity enough to store expanded image data of at least four number of colors in said first color space, and
    said reading buffer for expansion supplies the expanded image data of a corresponding color to said expander from said expanded image memory when said expander expands compressed image data in said first color space.

5. An image processor for printing according to anyone of claims 1 to 3, wherein image data in said first color space includes the image data of at least red (R), green (G) and blue (B), and image data in said second color space includes the image data of at least cyan (C), magenta (M), yellow (Y) and black (K).

6. An image processor for printing according to claim 1, wherein image data in said first color space includes four types of data having the image data of at least red (R), green (G) and blue (B) and color conversion attribute data (X), image data in said second color space includes four types of data of at least cyan (C), magenta (M), yellow (Y) and black (K), said expanded image memory includes first and second expanded image memories respectively having capacity enough to store at least four data, and
    said image data supply means (i) reads expanded image data in said first color space from said first and second expanded image memories in parallel, converts it to expanded image data in said second color space if said expanded image data is in said first color space, or (ii) suitably reads expanded image data corresponding to predetermined color from said first and second expanded image memories if said expanded image data is in said second color space.

7. An image processor for printing according to claim 1, wherein said print engine complies with a tandem system for printing the image data of plural colors in parallel, said expanded image memory has capacity enough to store expanded image data corresponding to plural colors, and
    said image data supply means (i) reads expanded image data in said first color space from said expanded image memory in parallel, converts it to expanded image data in said second color space and supplies it to said print engine, or (ii)
    supplies expanded image data in said second color space read from said expanded image memory and corresponding to said plural colors to said print engine in parallel.

8. An image processor for printing according to claim 1, wherein said print engine complies with a tandem system for printing the image data of plural colors in parallel, and said image data supply means (i) reads expanded image data in said first color space from said expanded image memory in parallel, converts the read image data to expanded image data in said second color space and supplies it to said print engine, or (ii)
    supplies expanded image data in said second color space read from said expanded image memory and corresponding to said plural colors to said print engine in parallel.

9. An image processor for printing, comprising:
    an expander for expanding supplied compressed image data every color in a first or second color space;
    an expanded image data memory having capacity enough to store expanded image data of at least four number of colors in said first color space, and for storing expanded image data in said first or second color space expanded by said expander;

image data supply means for reading said expanded image data from said expanded image memory, thereby
(i) converting said read data to expanded image data in second color space if said read data is expanded image data in said first color space and (ii) not converting said read data if said read data is expanded image data in said second color space; and a print engine for receiving said expanded image data in said second color space from said image data supply means to thereby print with toner in said second color space, wherein said image data supply means is controlled so as to be synchronized with the print engine.

10. An image processor for printing according to claim 9, wherein said image data supply means reads expanded image data of at least four number of colors in said first color space from said expanded image memory in parallel and converts it to expanded image data in said second color space.

11. An image processor for printing, comprising:
an expander for expanding supplied compressed image data every color in a first or second color space;
plural expanding units respectively having an expanded image memory for storing expanded image data in said first or second color space expanded by said expander and corresponding to at least four number of colors in said first color space;
image data supply means for reading said expanded image data from said expanded image memory, thereby (i) converting said read data to expanded image data in second color space if said read data is expanded image data in said first color space and (ii) not converting said read data if said read data is expanded image data in said second color space; and
a print engine for receiving said expanded image data in said second color space from said image data supply means to thereby print with toner in said second color spaces wherein said image data supply means is controlled so as to be synchronized with the print engine.

12. An image processor for printing according to claim 11, wherein said plural expanding units expand compressed image data every color in said first color space in parallel if said compressed image data corresponds to said first color space, and
said image data supply means reads expanded image data in said first color space from said expanded image memory in parallel and converts it to expanded image data in said second color space.

13. An image processor for printing according to any one of claims 11 and 12, further comprising a compressed image memory provided before said expanding unit for storing compressed image data in said first color space every color is provided, and
compressed image data in said first color space stored in said compressed image memory is supplied to a respective corresponding expanding unit in parallel.

14. An image processor for printing according to claim 11, wherein said print engine complies with a tandem system for printing the image data of plural colors in parallel,
and said image data supply means (i) reads expanded image data in said first color space from said expanded image memory in parallel, converts the read image data to expanded image data in said second color space and supplies it to said print engine, or (ii) supplies expanded image data in said second color space read from said expanded image memory and corresponding to said plural colors to said print engine in parallel.

* * * * *